United States Patent
King et al.

(10) Patent No.: US 12,230,137 B2
(45) Date of Patent: *Feb. 18, 2025

(54) MULTISPACE PARKING PAY STATIONS INCLUDING PAYMENT IMPROVEMENTS

(71) Applicant: IPS Group Inc., San Diego, CA (US)

(72) Inventors: David William King, Rancho Santa Fe, CA (US); Chad P. Randall, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,497

(22) Filed: Jun. 17, 2022

(65) Prior Publication Data

US 2023/0005369 A1    Jan. 5, 2023

Related U.S. Application Data

(63) Continuation of application No. 16/441,800, filed on Jun. 14, 2019, now Pat. No. 11,462,109.

(Continued)

(51) Int. Cl.
*G06Q 30/00* (2023.01)
*G06Q 20/10* (2012.01)
(Continued)

(52) U.S. Cl.
CPC ........... *G08G 1/148* (2013.01); *G06Q 20/102* (2013.01); *G06Q 20/3278* (2013.01);
(Continued)

(58) Field of Classification Search
CPC ...... G08G 1/148; G08G 1/149; G06Q 20/102; G06Q 20/3278; G06Q 30/0237;
(Continued)

(56) References Cited

U.S. PATENT DOCUMENTS

D161,888 S    2/1951   Wilkin
D246,917 S    1/1978   Sauter
(Continued)

FOREIGN PATENT DOCUMENTS

AT    507762 A1    7/2010
CA    2517717 A1   9/2004
(Continued)

OTHER PUBLICATIONS

"Implementation of RFID Technology in Parking Lot Access Control System". IEEE. 2007. (Year: 2007).*

(Continued)

*Primary Examiner* — Maria V Vanderhorst
(74) *Attorney, Agent, or Firm* — Wilson Sonsini Goodrich & Rosati

(57) ABSTRACT

Disclosed herein are multispace parking pay stations comprising: at least one processor, a memory, a communications element, a printer, and a computer program including instructions executable by the at least one processor to create an application comprising: a software module receiving a unique identifier associated with a parking customer, the parking customer having executed a mobile payment for parking in a space associated with the pay station; a software module transmitting the unique identifier to a central parking management server and querying the central parking management server with the unique identifier to identify the parking customer and verify the mobile payment; and a software module generating and sending instructions to the printer to print a payment verification for the parking customer.

20 Claims, 11 Drawing Sheets

Related U.S. Application Data

(60) Provisional application No. 62/685,584, filed on Jun. 15, 2018.

(51) Int. Cl.

| | |
|---|---|
| *G06Q 20/32* | (2012.01) |
| *G06Q 30/0207* | (2023.01) |
| *G06Q 30/0251* | (2023.01) |
| *G08G 1/14* | (2006.01) |
| *G05B 19/418* | (2006.01) |

(52) U.S. Cl.
CPC ..... *G06Q 30/0237* (2013.01); *G06Q 30/0253* (2013.01); *G08G 1/149* (2013.01)

(58) Field of Classification Search
CPC .............. G06Q 30/0253; G06Q 20/02; G06Q 20/3267; G06Q 20/34; G06Q 20/36; G07F 17/24
See application file for complete search history.

(56) References Cited

U.S. PATENT DOCUMENTS

| | | |
|---|---|---|
| D278,689 S | 5/1985 | Jupe |
| 4,615,280 A | 10/1986 | Shoop et al. |
| 4,754,126 A | 6/1988 | Caldwell |
| 5,065,156 A | 11/1991 | Bernier |
| D331,996 S | 12/1992 | Fukutake et al. |
| D336,860 S | 6/1993 | Clough |
| D342,209 S | 12/1993 | Clough |
| D354,047 S | 1/1995 | Leggate et al. |
| D360,734 S | 7/1995 | Hall |
| D360,737 S | 7/1995 | Helbig, Jr. |
| D375,607 S | 11/1996 | Hall |
| D396,655 S | 8/1998 | Anderson |
| 5,915,246 A | 6/1999 | Patterson et al. |
| D412,289 S | 7/1999 | Winwood |
| 6,029,888 A | 2/2000 | Harvey |
| D430,045 S | 8/2000 | Omuro et al. |
| D431,788 S | 10/2000 | Tuxen et al. |
| D437,468 S | 2/2001 | Fukutake et al. |
| 6,230,868 B1 | 5/2001 | Tuxen et al. |
| 6,275,169 B1 | 8/2001 | Krygler et al. |
| D447,519 S | 9/2001 | Pinchuk et al. |
| D448,910 S | 10/2001 | Kit |
| D450,253 S | 11/2001 | Marguet |
| D454,421 S | 3/2002 | Jeon |
| D456,587 S | 4/2002 | Kit et al. |
| D460,005 S | 7/2002 | Jacquet |
| 6,505,774 B1 | 1/2003 | Fulcher et al. |
| D472,362 S | 3/2003 | Zerman et al. |
| 6,527,172 B1 | 3/2003 | Lewis et al. |
| D481,516 S | 10/2003 | Magee |
| D485,417 S | 1/2004 | Magee |
| D488,280 S | 4/2004 | Zerman |
| D492,080 S | 6/2004 | Magee |
| D492,081 S | 6/2004 | Magee |
| D494,730 S | 8/2004 | Magee |
| D497,814 S | 11/2004 | Odinotski et al. |
| D505,240 S | 5/2005 | Swaine et al. |
| D505,765 S | 5/2005 | Swaine et al. |
| D510,751 S | 10/2005 | Magee et al. |
| 7,004,385 B1 | 2/2006 | Douglass |
| 7,019,670 B2 | 3/2006 | Bahar |
| 7,028,888 B2 | 4/2006 | Laskowski et al. |
| 7,040,534 B2 | 5/2006 | Turocy et al. |
| D530,880 S | 10/2006 | Magee et al. |
| 7,131,576 B2 | 11/2006 | Utz et al. |
| D538,505 S | 3/2007 | Kang |
| 7,222,782 B2 | 5/2007 | Lute et al. |
| 7,284,692 B1 | 10/2007 | Douglass |
| 7,347,368 B1 | 3/2008 | Gravelle et al. |
| D570,920 S | 6/2008 | Choi |
| 7,419,091 B1 | 9/2008 | Scanlon |
| D579,795 S | 11/2008 | Martinez et al. |
| 7,445,144 B2 | 11/2008 | Schlabach et al. |
| D582,125 S | 12/2008 | Kang et al. |
| D592,825 S | 5/2009 | Kang et al. |
| 7,533,802 B1 | 5/2009 | Mcginley et al. |
| D596,373 S | 7/2009 | Kang et al. |
| D596,374 S | 7/2009 | Kang |
| 7,575,166 B2 | 8/2009 | Mcnamara |
| 7,611,045 B1 | 11/2009 | Lute et al. |
| 7,624,919 B2 | 12/2009 | Meek et al. |
| 7,699,224 B2 | 4/2010 | Mole |
| D615,274 S | 5/2010 | Kim et al. |
| 7,717,327 B2 | 5/2010 | Gomes et al. |
| 7,726,558 B1 | 6/2010 | Lute et al. |
| D625,305 S | 10/2010 | Bleck |
| D629,585 S | 12/2010 | Bleck et al. |
| D632,740 S | 2/2011 | Adeline |
| 7,891,546 B1 | 2/2011 | Steinbach et al. |
| D645,223 S | 9/2011 | Bleck |
| D651,784 S | 1/2012 | Rohan et al. |
| D652,601 S | 1/2012 | Rohan et al. |
| D652,602 S | 1/2012 | Rohan et al. |
| D652,872 S | 1/2012 | Mougin et al. |
| D653,012 S | 1/2012 | Rohan et al. |
| D653,014 S | 1/2012 | Rohan |
| D653,420 S | 1/2012 | Rohan |
| D653,421 S | 1/2012 | Rohan |
| D653,422 S | 1/2012 | Rohan et al. |
| D653,423 S | 1/2012 | Rohan et al. |
| D653,424 S | 1/2012 | Rohan |
| D656,046 S | 3/2012 | Mackay et al. |
| 8,181,857 B1 | 5/2012 | Lute et al. |
| D661,603 S | 6/2012 | Mackay et al. |
| D672,525 S | 12/2012 | Lee et al. |
| D674,985 S | 1/2013 | Lee |
| D677,035 S | 2/2013 | Lee |
| D677,714 S | 3/2013 | Helgesson et al. |
| D680,156 S | 4/2013 | Hernandez et al. |
| D681,717 S | 5/2013 | Helgesson et al. |
| D682,504 S | 5/2013 | Lee et al. |
| D684,745 S | 6/2013 | Reuter |
| D691,165 S | 10/2013 | Attoma |
| D693,983 S | 11/2013 | Budde et al. |
| 8,573,484 B1 | 11/2013 | Irudayam et al. |
| D696,484 S | 12/2013 | Lee |
| D696,485 S | 12/2013 | Lee |
| D702,913 S | 4/2014 | Budde |
| D702,914 S | 4/2014 | Budde |
| D705,090 S | 5/2014 | Mackay et al. |
| D707,140 S | 6/2014 | King et al. |
| D707,141 S | 6/2014 | King et al. |
| D707,142 S | 6/2014 | King et al. |
| D716,157 S | 10/2014 | Mackay et al. |
| D716,515 S | 10/2014 | Cha |
| D722,740 S | 2/2015 | Budde |
| D724,290 S | 3/2015 | Cha et al. |
| D724,811 S | 3/2015 | Reitinger |
| D724,812 S | 3/2015 | Cha et al. |
| D725,504 S | 3/2015 | McEneany et al. |
| D728,190 S | 4/2015 | Sheley |
| D732,263 S | 6/2015 | Budde et al. |
| D735,437 S | 7/2015 | Randall et al. |
| D735,438 S | 7/2015 | Randall et al. |
| D735,439 S | 7/2015 | Randall |
| D735,440 S | 7/2015 | Randall et al. |
| D735,963 S | 8/2015 | Randall et al. |
| D735,964 S | 8/2015 | Randall |
| D735,965 S | 8/2015 | Randall et al. |
| D739,637 S | 9/2015 | Randall |
| D739,638 S | 9/2015 | Randall |
| D739,639 S | 9/2015 | Randall |
| D741,040 S | 10/2015 | Budde et al. |
| D742,090 S | 10/2015 | Randall |
| D743,956 S | 11/2015 | Kraft et al. |
| D746,015 S | 12/2015 | King et al. |
| D748,364 S | 1/2016 | King et al. |
| D748,888 S | 2/2016 | King et al. |
| D749,290 S | 2/2016 | Pollmann |
| D755,649 S | 5/2016 | King et al. |

(56) References Cited

U.S. PATENT DOCUMENTS

| | | | |
|---|---|---|---|
| D762,040 S | 7/2016 | King et al. | |
| D769,570 S | 10/2016 | Kraft et al. | |
| D769,571 S | 10/2016 | Lee et al. | |
| D769,572 S | 10/2016 | Park et al. | |
| D779,771 S | 2/2017 | King et al. | |
| D779,772 S | 2/2017 | King et al. | |
| D779,773 S | 2/2017 | King et al. | |
| D779,774 S | 2/2017 | King et al. | |
| D781,024 S | 3/2017 | King et al. | |
| 9,601,018 B2 | 3/2017 | Cogill et al. | |
| D791,621 S | 7/2017 | Loye et al. | |
| D792,049 S | 7/2017 | Oh et al. | |
| D795,523 S | 8/2017 | King et al. | |
| D802,874 S | 11/2017 | King et al. | |
| D802,875 S | 11/2017 | King et al. | |
| D802,876 S | 11/2017 | King et al. | |
| D802,877 S | 11/2017 | King et al. | |
| D802,878 S | 11/2017 | King et al. | |
| 9,842,455 B2 | 12/2017 | Mackay et al. | |
| D813,059 S | 3/2018 | Mackay et al. | |
| D832,553 S | 10/2018 | Angelopoulos et al. | |
| D863,074 S | 10/2019 | Mackay et al. | |
| D863,075 S | 10/2019 | Mackay et al. | |
| D863,076 S | 10/2019 | Mackay et al. | |
| D863,987 S | 10/2019 | Mackay et al. | |
| D863,988 S | 10/2019 | Mackay et al. | |
| D879,404 S | 3/2020 | Morishita et al. | |
| D883,605 S | 5/2020 | Lee et al. | |
| D901,825 S | 11/2020 | Nelson et al. | |
| RE48,566 E | 5/2021 | Mackay et al. | |
| D955,230 S | 6/2022 | King et al. | |
| D955,231 S | 6/2022 | King et al. | |
| 2004/0016796 A1 | 1/2004 | Hanna et al. | |
| 2004/0030601 A1* | 2/2004 | Pond | G06Q 20/327 705/16 |
| 2004/0059693 A1 | 3/2004 | Hausen et al. | |
| 2004/0243526 A1 | 12/2004 | Krygler et al. | |
| 2004/0262379 A1 | 12/2004 | Gomes | |
| 2005/0029340 A1 | 2/2005 | Ferraro | |
| 2006/0152385 A1 | 7/2006 | Mandy | |
| 2007/0046651 A1 | 3/2007 | Sinclair et al. | |
| 2007/0276724 A1 | 11/2007 | Catt et al. | |
| 2008/0257965 A1 | 10/2008 | Klein et al. | |
| 2008/0265019 A1 | 10/2008 | Artino et al. | |
| 2008/0296365 A1 | 12/2008 | Schliebe | |
| 2009/0057398 A1 | 3/2009 | Douglass et al. | |
| 2009/0177580 A1* | 7/2009 | Lowenthal | B60L 53/305 705/39 |
| 2010/0161489 A1 | 6/2010 | Goodall et al. | |
| 2010/0187300 A1 | 7/2010 | Ramachandran et al. | |
| 2010/0241564 A1 | 9/2010 | Miller et al. | |
| 2010/0243729 A1 | 9/2010 | Russell et al. | |
| 2011/0062230 A1* | 3/2011 | Ward, II | G06Q 30/04 705/13 |
| 2011/0133613 A1 | 6/2011 | Descamps et al. | |
| 2011/0320243 A1 | 12/2011 | Khan | |
| 2012/0286036 A1 | 11/2012 | Jones et al. | |
| 2013/0262275 A1* | 10/2013 | Outwater | G06Q 10/02 705/44 |
| 2014/0165885 A1 | 6/2014 | Denny et al. | |
| 2017/0262882 A1* | 9/2017 | Shina | G06Q 30/0275 |
| 2017/0323227 A1* | 11/2017 | Sadeghi | G06Q 20/102 |
| 2018/0025550 A1 | 1/2018 | Hudson et al. | |
| 2019/0385454 A1 | 12/2019 | King et al. | |

FOREIGN PATENT DOCUMENTS

| | | | |
|---|---|---|---|
| EP | 1227448 | A2 | 7/2002 |
| FR | 2928678 | A1 | 9/2009 |
| FR | 2979726 | A1 | 3/2013 |
| JP | 3441832 | B2 | 9/2003 |
| JP | 4247079 | B2 | 4/2009 |
| JP | 5238316 | B2 | 7/2013 |
| WO | WO-02084600 | A1 | 10/2002 |
| WO | WO-03065322 | A1 | 8/2003 |
| WO | WO-2010062105 | A2 | 6/2010 |
| WO | WO-2014127384 | A1 | 8/2014 |

OTHER PUBLICATIONS

"Prototype for multiple applications using Near Field Communication (NFC) technology on android device". IEEE. 2015. (Year: 2015).*

Alibaba: Ticket dispenser parking management system auto payment station machine street parking meter coin parking meters, pp. 1-7. https://www.alibaba.com/product-detail/Ticket-dispenser-parking-management-system-auto_60612328565.html [retrieved online Mar. 22, 2023] (2023).

Made-in-China: Pay Station for Payment—Parking Meter with Solar, Parking Management Payment, Automatic Park Pay Station for Car Parking Management Payment, pp. 1-3. https://www.made-in-china.com/showroom/13121018wkf/product-detailGXFEHIvrYApc/China-Pay-Station-for-Payment-Parking-Meter-with-Solar-Parking-Management [retrieved online Mar. 22, 2023] (2023).

Par-Kut International: Pay Station Shelters, pp. 1-3 https://www.parkut.com/products/shelters/pay-station-shelters/ [retrieved online Mar. 22, 2023] copyright 2023. (2023).

E-Bay: Amano Mcgann MSM Metric Elite LS Solar Electric Parking Lot Credit Pay Station, 5 pages. www.ebay.com/itm/363873148900 (2022).

Co-pending U.S. Appl. No. 29/856,410, inventors King; David William et al., filed Oct. 13, 2022.

Co-pending U.S. Appl. No. 29/856,413, inventors King; David William et al., filed Oct. 13, 2022.

Co-pending U.S. Appl. No. 29/856,417, inventors King; David William et al., filed Oct. 13, 2022.

Co-pending U.S. Appl. No. 29/879,435, inventors Tan; Choor Hong et al., filed Jul. 7, 2023.

Co-pending U.S. Appl. No. 29/700,892, inventors King; David William et al., filed Aug. 6, 2019.

Co-pending U.S. Appl. No. 29/700,893, inventors King; David William et al., filed Aug. 6, 2019.

Co-pending U.S. Appl. No. 29/700,894, inventors King; David William et al., filed Aug. 6, 2019.

Co-pending U.S. Appl. No. 29/839,308, inventors King; David William et al., filed May 19, 2022.

Co-pending U.S. Appl. No. 29/839,309, inventor King; David William, filed May 19, 2022.

Garra et al.: A Privacy-Preserving Pay-by-Phone Parking System. Computer Science IEEE Transactions on Vehicular Technology, pp. 1-10 DOI:10.1109/TVT.2016.2634785 (2017).

No change for car park charge? Just RingGo, https://www.northern-times.co.uk/news/no-change-for-car-park-charge-just-ringgo-140901/, Jul. 6, 2017.

Parking Pay Stations, https://www.cityofcocoabeach.com/642/Parking-Pay-Stations, retrieved on Jun. 10, 2021.

U.S. Appl. No. 18/356,577 Office Action dated Nov. 21, 2024.

* cited by examiner

MULTISPACE PARKING PAY STATIONS INCLUDING PAYMENT IMPROVEMENTS

CROSS-REFERENCE TO RELATED APPLICATION

This application is a continuation of U.S. application Ser. No. 16/441,800, filed Jun. 14, 2019, which claims the benefit of U.S. Application Ser. No. 62/685,584, filed Jun. 15, 2018, which are hereby incorporated by reference in their entirety.

BACKGROUND OF THE INVENTION

Parking meters and pay-and-display machines are commonly used for regulating parking in parking lots. A parking meter is set up for an individual parking space which accepts cash or other payment while a pay-and-display machine which works for multiple parking spaces rely on a customer to purchase a ticket from the machine and display the ticket on the vehicle.

SUMMARY OF THE INVENTION

Parking meters and pay-and-display machines are commonly used for regulating parking in parking lots. Parking meters have to be set up at individual parking space, and they either require regular service to empty the coins or additional costs to enable other type of payments at individual meters. Further, drivers can very often take advantage of parking meters that have time remaining. Pay-and-display machines differ from road-side parking meters in that one machine can service multiple vehicle spaces, resulting in lower set up costs. In addition, these machines generally accept payments other than cash so that costs associated with services to empty coin are lower. These machines also reduce the occurrence of drivers taking advantage of parking meters that have time remaining. However, it can get really inconvenient and time consuming for a drive to input correct information about his/her vehicle, indicate a specific space number that he or she parks. Any possible error during data entry may further propagate to enforcement, such as issuing a ticket with the incorrect plate number. Additionally, it becomes extremely troublesome when a machine fails to properly print a receipt to be displayed on the dashboard after a payment. As such, there is an unmet need to provide a simpler, faster, and more reliable parking and pay regime.

The pay stations, methods, and platforms disclosed herein enable an easy-to-use, fast, convenient, and reliable parking and pay regime. Main advantages associated with the pay stations, methods, and platforms herein include complete elimination of mistakes that can be generated at pay-and-display machine during data entry; fast and convenient identification of the parking customer and vehicles, easy-to-use and highly efficient payment via mobile payment or via pre-selected payment or pre-set payment at a remote a central server, significantly reduced cost and time in enforcement without the need to manually check the payment verifications on dashboards. Further, such pay stations or platforms reduce regular service or set-up at individual parking space, thus, greatly save the overall costs. Additional features such as parking reminder or prepaid account, that are not feasible with the traditional parking regimens are also enabled with the pay stations, methods, and platforms disclosed herein. The disclosure herein also enables the parking user to use easy-to-remember alias which are associated with actual license plate numbers so that the user do not have to remember or select the actual license plate when the user is at the parking pay station. The pay stations, methods, and platforms disclosed herein also advantageous allow a parking user who uses mobile payment for parking to get printed payment verification at the pay station, which is not feasible with traditional mobile payments. The pay stations, methods, and platforms disclosed herein can also be adapted for use in payment for various admissions other than parking so that a user could easily and conveniently pay for event, services, or other admissions just like parking and have a printed payment verification at the pay station.

In one aspect, disclosed herein are multispace parking pay stations comprising: a at least one processor, a memory, a communications element, a printer, and a computer program including instructions executable by the at least one processor to create an application comprising: a software module receiving a unique identifier associated with a parking customer, the parking customer having executed a mobile payment for parking in a space associated with the pay station; a software module transmitting the unique identifier to a central parking management server and querying the central parking management server with the unique identifier to identify the parking customer and verify the mobile payment; and a software module generating and sending instructions to the printer to print a payment verification for the parking customer. In some cases, the pay station further comprises a camera. In some cases, the camera captures images and videos (or "camera data") of the surroundings adjacent to the pay stations and records people and objects, including moving and non-moving vehicles. In some cases, the application further comprises artificial intelligence, big-data, and/or machine-learning sub-programs to analyze the camera data and aids in the detection of vehicles (e.g., stolen vehicles), the detection of the identities of people (e.g., registered user, missing persons or fugitives), the demographics of the people, and events (e.g., vandalisms). In some cases, the application and its sub-programs comprise facial recognition software to help detect people's identities. In some cases, camera data from multiple pay stations are pooled together for the analysis. In some cases, the pay station is associated with 2-100 parking spaces. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the parking customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator of the parking spaces associated with the pay station. In some cases, the payment verification is a receipt. In some cases, the payment verification is an expense report. In some cases, the payment verification is a replacement receipt. In some cases, the payment verification is utilized in a pay-and-display parking regime. In some cases, the application further comprises a software module determining an advertisement appropriate for the parking customer. In some cases, the advertisement is determined based, at least in part by, the identity of the parking customer, a parking history of the customer, a transaction history of the parking customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the parking customer. In some cases, the parking pay station communicate with a remote server and receive confirmation that the parking customer is entitled to a confirmed ticket to an event (e.g., a ticket to a movie or Broadway show, a train/cruise/flight ticket, a lottery ticket, etc.). In some cases, the application of the parking pay station prints the confirmed ticket to the event for the parking customer using the printer of the parking pay station. In some cases, a parking customer provides his or unique identifier described herein at the parking pay station and uses the application of the parking pay station to authorize payment and execute payment for activities other than parking near the parking pay station. In certain cases, the parking customer pays his or her phone bills or rental bills by using the parking pay station and its application.

In another aspect, disclosed herein are computer-implemented method comprising: receiving, by a multispace parking pay station, a unique identifier associated with a parking customer, the parking customer having executed a mobile payment for parking in a space associated with the pay station; transmitting, by the pay station, the unique identifier to a central parking management server; querying, by the pay station, the central parking management server with the unique identifier to identify the parking customer and verify the mobile payment; and printing, by the pay station, a payment verification for the customer. In some cases, the pay station is associated with 2-100 parking spaces. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the parking customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator of the parking spaces associated with the pay station. In some cases, the payment verification is a receipt. In some cases, the payment verification is an expense report. In some cases, the payment verification is a replacement receipt. In some cases, the payment verification is utilized in a pay-and-display parking regime. In some cases, the application further comprises a software module determining an advertisement appropriate for the parking customer. In some cases, the advertisement is determined based, at least in part by, the identity of the parking customer, a parking history of the customer, a transaction history of the parking customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the parking customer.

In another aspect, disclosed herein are parking payment platforms comprising: at least one mobile processor configured to provide a mobile payment application comprising a software module executing a mobile payment for parking in a parking space; and a multispace parking pay station comprising: a software module receiving a unique identifier associated with a parking customer, the parking customer having executed a mobile payment for parking in a space associated with the pay station via the mobile payment application; a software module transmitting the unique identifier to a central parking management server and querying the central parking management server with the unique identifier to identify the parking customer and verify the mobile payment; a software module determining an advertisement appropriate for the parking customer; and a software module generating and sending instructions to the printer to print a payment verification for the user, the payment verification comprising the advertisement. In some cases, the parking pay station further comprises a scanner integrated with the parking payment platform. In some cases, the scanner is an infrared scanner, a barcode scanner, a radio-frequency identification (RFID) scanner, a near field communication (NFC) scanner, or a Bluetooth scanner. In some cases, the scanner scans, barcodes, coupon codes, RFID codes, or quick response (QR) codes. In some cases, the parking pay station or the parking payment platform further comprises a QR code analysis unit configured to analyze the scanned QR code. In some cases, the parking pay station or the parking payment platform further comprises a barcode analysis unit configured to analyze the scanned barcode. In some cases, the parking pay station or the parking payment platform further comprises a code radiation unit configured to radiate tag applets of the scanned QR code and the scanned barcode.

In yet another aspect, disclosed herein are parking payment platforms comprising: a central parking management server configured to provide a parking payment application comprising a software module allowing a parking customer to create an account and associate one or more license plates with the account; a multispace parking pay station comprising: a communications element; a software module receiving an identifier associated with the parking customer or the account; a software module querying, via the communications element, the central parking management server with the identifier to identify the account and the one or more license plates associated with the account; a software module receiving, via the communications element, the one or more license plates associated with the account; a software module presenting an interface allowing the parking customer to select one of the one or more license plates; and a software module automatically requesting, via the communications element, the central parking management server to execute a payment for the parking customer, the payment for parking a vehicle with the selected license plate. In some cases, the pay station is associated with 2-100 parking spaces. In some cases, information of the account comprises one or more of: an account number, a user ID, a name, one or more license plates, a payment method, and payment information of the parking customer. In some cases, the software module allowing the parking customer to create the account and associate the one or more vehicles with the account further comprises allowing the parking customer to save payment information. In some cases, the identifier is a credit card, a driver license, a mobile device, an RFID, a microchip, a magnetic strip, a user ID, or an account number associated with the parking customer. In some cases, the pay station receives the identifier via optical scanning, reading a magnetic strip, entry via a keypad, near field communication signal, reading an RFID, or a combination thereof. In some cases, the central parking management server further comprises a database, the database comprising a plurality of accounts, each of the accounts associated with a parking customer. In some cases, the software module allowing the parking customer to select one of the one or more license plates utilizes a user interface and an input device. In some cases, the payment is authorized by the identifier. In some cases, the central parking management server further comprises a software module automatically sending a parking reminder to the parking customer before or at a time when a paid parking time expires. In some cases, the central parking management server further comprises a software module automatically displaying or sending a notice of balance on the account associated with the parking customer to the parking customer. In some cases, the central parking management server further comprises a software module determining an advertisement appropriate for the parking customer. In some cases, the advertisement is determined based, at least in part by, the identity of the parking customer, a parking history of the customer, a transaction history of the parking customer, a location of the pay station, a time of day, a day of a week, current promotions offered by nearby vendors, or a combination thereof. In some cases, the advertisement is printed or displayed on a payment verification. In some cases, the advertisement is presented on a display of the pay station. In some cases, the advertisement is presented on a display of a mobile device of the parking customer. The platform disclosed herein further comprises a hand-held device comprising: a sensor that receives a license plate number of a parked vehicle and a mobile communications element that communicates the received license plate number to the central parking management server to check payment or non-payment of the parked vehicle. In some cases, the communications element is a wireless communications element. In some cases, the one of the one or more license plates is associated with an alias. In some cases, the software module receiving, via the communications element, the one or more license plates associated with the account comprises receiving, via the communication element, one or more aliases associated with the account, each of the one or more alias representing at least one of the one or more license plates. In some cases, the software module presenting the interface allowing the parking customer to select the one of the one or more license plates comprises presenting the interface allowing the parking customer to select the alias representing the one of the one or more license plates.

In yet another aspect, disclosed herein are pay stations comprising: at least one processor, a memory, a communications element, a printer, and a computer program including instructions executable by the at least one processor to create an application comprising: a software module receiving a unique identifier associated with a customer, the customer having executed a mobile payment for an admission associated with the pay station; a software module transmitting the unique identifier to a central management server and querying the central management server with the unique identifier to identify the customer and verify the mobile payment; and a software module generating and sending instructions to the printer to print a payment verification for the customer. In some cases, the admission is for an event, an activity, service, or transportation. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator associated with the pay station. In some cases, the payment verification is a receipt. In some cases, the payment verification is an expense report. In some cases, the payment verification is a replacement receipt. In some cases, the payment verification is utilized in a pay-and-display regime. In some cases, the application further comprises a software module determining an advertisement appropriate for the customer. In some cases, the advertisement is determined based, at least in part by, the identity of the customer, a transaction history of the customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the customer.

In still yet another aspect, disclosed herein are computer-implemented methods comprising: receiving, by a pay station, a unique identifier associated with a customer, the customer having executed a mobile payment for an admission associated with the pay station; transmitting, by the pay station, the unique identifier to a central management server; querying, by the pay station, the central management server with the unique identifier to identify the customer and verify the mobile payment; and printing, by the pay station, a payment verification for the customer. In some cases, the admission is for an event, an activity, service, or transportation. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator associated with the pay station. In some cases, the payment verification is a receipt. In some cases, the payment verification is an expense report. In some cases, the payment verification is a replacement receipt. In some cases, the payment verification is utilized in a pay-and-display regime. In some cases, the application further comprises a software module determining an advertisement appropriate for the customer. In some cases, the advertisement is determined based, at least in part by, the identity of the customer, a transaction history of the customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the customer.

In still yet another aspect, disclosed herein are payment platforms comprising: at least one mobile processor configured to provide a mobile payment application comprising a software module executing a mobile payment for an admission; and a pay station comprising: a software module receiving a unique identifier associated with a customer, the customer having executed a mobile payment for the admission associated with the pay station via the mobile payment application; a software module transmitting the unique identifier to a central management server and querying the central management server with the unique identifier to identify the customer and verify the mobile payment; a software module determining an advertisement appropriate for the customer; and a software module generating and sending instructions to the printer to print a payment verification for the customer, the payment verification comprising the advertisement.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION OF THE INVENTION

Figure 1:
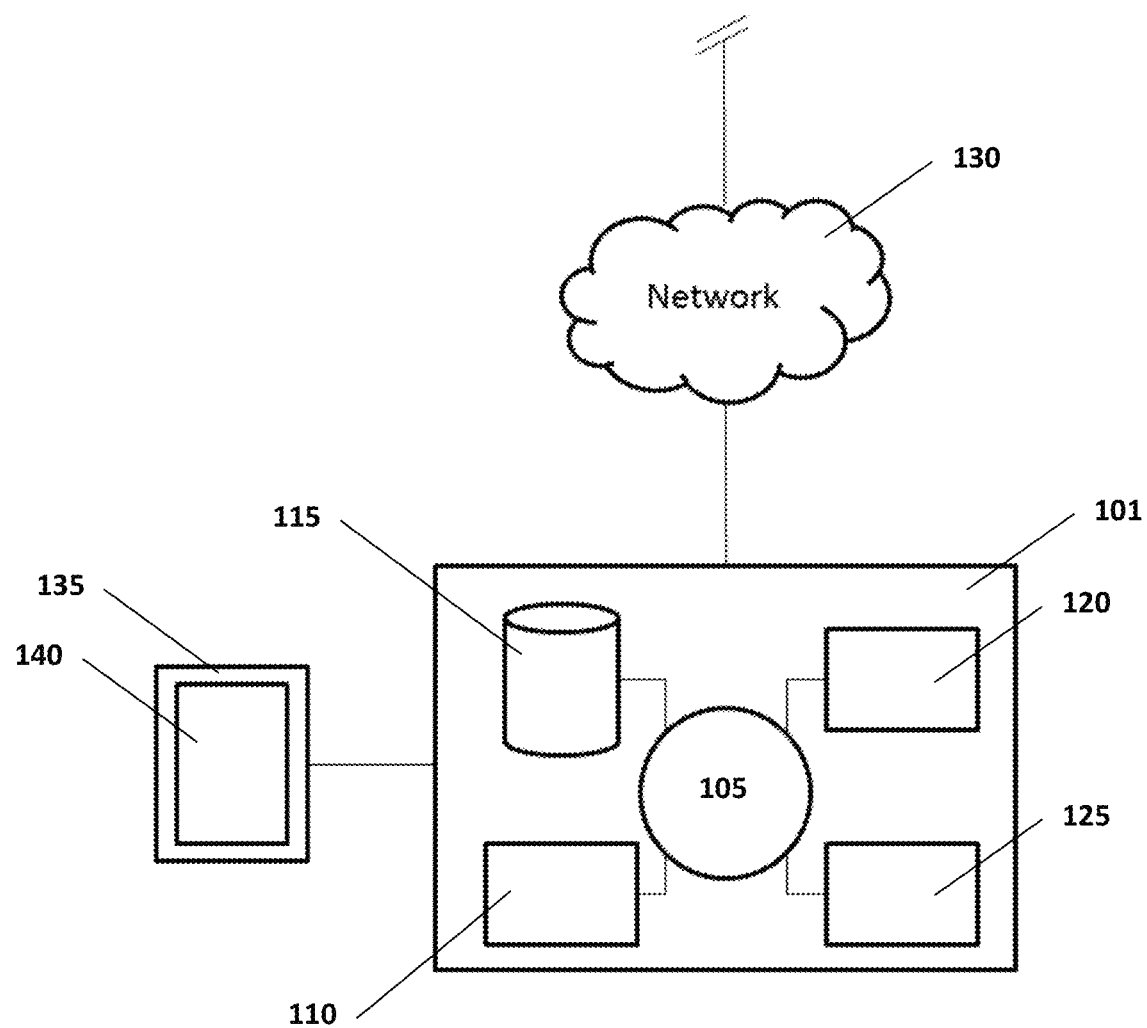
FIG. 1 shows a non-limiting schematic diagram of a processing device; in this case, a device with one or more CPUs, a memory, a communication interface, and a display.

Parking meters and pay-and-display machines are commonly used for regulating parking in parking lots. Parking meters have to be set up at individual parking space, and they either require regular service to empty the coins or additional costs to enable other type of payments at individual meters. Further, drives can very often take advantage of parking meters that have time remaining. Pay-and-display machines differ from road-side parking meters in that one machine can service multiple vehicle spaces, resulting in lower set up costs. In addition, these machines generally accept payments other than cash so that costs associated with services to empty coin are lower. These machines also reduce the occurrence of drivers taking advantage of parking meters that have time remaining. However, it can get really inconvenient and time consuming for a drive to input correct information about his/her vehicle, indicate a specific space number that he or she parks. Any possible error during data entry may further propagate to enforcement, such as issuing a ticket with the incorrect plate number. Additionally, it becomes extremely troublesome when a machine fails to properly print a receipt to be displayed on the dashboard after a payment. As such, there is an unmet need to provide a simpler, faster, and more reliable parking and pay regime.

The pay stations, methods, and platforms disclosed herein enable an easy-to-use, fast, convenient, and reliable parking and pay regime. Main advantages associated with the pay stations, methods, and platforms herein include complete elimination of mistakes that can be generated at pay-and-display machine during data entry; fast and convenient identification of the parking customer and vehicles, easy-to-use and highly efficient payment via mobile payment or via pre-selected payment or pre-set payment at a remote a central server, significantly reduced cost and time in enforcement without the need to manually check the payment verifications on dashboards. Further, such pay stations or platforms do not require regular service or set-up at individual parking space, thus, greatly save the overall costs. Additional features such as parking reminder or prepaid account, that are not feasible with the traditional parking regimens are also enabled with the pay stations, methods, and platforms disclosed herein. The disclosure herein also enables the parking user to use easy-to-remember alias which are associated with actual license plate numbers so that the user do not have to remember or select the actual license plate when the user is at the parking pay station. The pay stations, methods, and platforms disclosed herein also advantageous allow a parking user who uses mobile payment for parking to get printed payment verification at the pay station, which is not feasible with traditional mobile payments. The pay stations, methods, and platforms disclosed herein can also be adapted for use in payment for various admissions other than parking so that a user could easily and conveniently pay for event, services, or other admissions just like parking and have a printed payment verification at the pay station.

Disclosed herein, in certain embodiments, are multispace parking pay stations comprising: a processor, a memory, a communications element, a printer, and a computer program including instructions executable by the processor to create an application comprising: a software module receiving a unique identifier associated with a parking customer, the parking customer having executed a mobile payment for parking in a space associated with the pay station; a software module transmitting the unique identifier to a central parking management server and querying the central parking management server with the unique identifier to identify the parking customer and verify the mobile payment; and a software module generating and sending instructions to the printer to print a payment verification for the parking customer. In various cases, the pay station is associated with at least about 2, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, 400, or more parking spaces, including increments therein. In various cases, the pay station is associated with at least about 2, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, or 400 parking spaces, including increments therein. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the parking customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator of the parking spaces associated with the pay station. In some cases, the payment verification is a receipt. In some cases, the payment verification is an expense report. In some cases, the payment verification is a replacement receipt. In some cases, the payment verification is utilized in a pay-and-display parking regime. In some cases, the application further comprises a software module determining an advertisement appropriate for the parking customer. In some cases, the advertisement is determined based, at least in part by, the identity of the parking customer, a parking history of the customer, a transaction history of the parking customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the parking customer.

Disclosed herein, in certain embodiments, are computer-implemented method comprising: receiving, by a multispace parking pay station, a unique identifier associated with a parking customer, the parking customer having executed a mobile payment for parking in a space associated with the pay station; transmitting, by the pay station, the unique identifier to a central parking management server; querying, by the pay station, the central parking management server with the unique identifier to identify the parking customer and verify the mobile payment; and printing, by the pay station, a payment verification for the customer. In various cases, the pay station is associated with at least about 2, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, 400, or more parking spaces, including increments therein. In various cases, the pay station is associated with at least about 2, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, or 400 parking spaces, including increments therein. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the parking customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator of the parking spaces associated with the pay station. In some cases, the payment verification is a receipt. In some cases, the payment verification is an expense report.

In some cases, the payment verification is a replacement receipt. In some cases, the payment verification is utilized in a pay-and-display parking regime. In some cases, the application further comprises a software module determining an advertisement appropriate for the parking customer. In some cases, the advertisement is determined based, at least in part by, the identity of the parking customer, a parking history of the customer, a transaction history of the parking customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the parking customer.

Disclosed herein, in certain embodiments, are parking payment platforms comprising: at least one mobile processor configured to provide a mobile payment application comprising a software module executing a mobile payment for parking in a parking space; and a multispace parking pay station comprising: a software module receiving a unique identifier associated with a parking customer, the parking customer having executed a mobile payment for parking in a space associated with the pay station via the mobile payment application; a software module transmitting the unique identifier to a central parking management server and querying the central parking management server with the unique identifier to identify the parking customer and verify the mobile payment; a software module determining an advertisement appropriate for the parking customer; and a software module generating and sending instructions to the printer to print a payment verification for the user, the payment verification comprising the advertisement.

Disclosed herein, in certain embodiments, are parking payment platforms comprising: a central parking management server configured to provide a parking payment application comprising a software module allowing a parking customer to create an account and associate one or more license plates with the account; a multispace parking pay station comprising: a communications element; a software module receiving an identifier associated with the parking customer or the account; a software module querying, via the communications element, the central parking management server with the identifier to identify the account and the one or more license plates associated with the account; a software module receiving, via the communications element, the one or more license plates associated with the account; a software module presenting an interface allowing the parking customer to select one of the one or more license plates; and a software module automatically requesting, via the communications element, the central parking management server to execute a payment for the parking customer, the payment for parking a vehicle with the selected license plate. In various cases, the pay station is associated with at least about 2, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, 400, or more parking spaces, including increments therein. In various cases, the pay station is associated with at least about 2, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, or 400 parking spaces, including increments therein. In some cases, information of the account comprises one or more of: an account number, a user ID, a name, one or more license plates, a payment method, and payment information of the parking customer. In some cases, the software module allowing the parking customer to create the account and associate the one or more vehicles with the account further comprises allowing the parking customer to save payment information. In some cases, the identifier is a credit card, a driver license, a mobile device, an RFID, a microchip, a magnetic strip, a user ID, or an account number associated with the parking customer. In some cases, the pay station receives the identifier via optical scanning, reading a magnetic strip, entry via a keypad, near field communication signal, reading an RFID, or a combination thereof. In some cases, the central parking management server further comprises a database, the database comprising a plurality of accounts, each of the accounts associated with a parking customer. In some cases, the software module allowing the parking customer to select one of the one or more license plates utilizes a user interface and an input device. In some cases, the payment is authorized by the identifier. In some cases, the central parking management server further comprises a software module automatically sending a parking reminder to the parking customer before or at a time when a paid parking time expires. In some cases, the central parking management server further comprises a software module automatically displaying or sending a notice of balance on the account associated with the parking customer to the parking customer. In some cases, the central parking management server further comprises a software module determining an advertisement appropriate for the parking customer. In some cases, the advertisement is determined based, at least in part by, the identity of the parking customer, a parking history of the customer, a transaction history of the parking customer, a location of the pay station, a time of day, a day of a week, current promotions offered by nearby vendors, or a combination thereof. In some cases, the advertisement is printed or displayed on a payment verification. In some cases, the advertisement is presented on a display of the pay station. In some cases, the advertisement is presented on a display of a mobile device of the parking customer. The platform disclosed herein further comprises a hand-held device comprising: a sensor that receives a license plate number of a parked vehicle and a mobile communications element that communicates the received license plate number to the central parking management server to check payment or non-payment of the parked vehicle. In some cases, the communications element is a wireless communications element. In some cases, the one of the one or more license plates is associated with an alias. In some cases, the software module receiving, via the communications element, the one or more license plates associated with the account comprises receiving, via the communication element, one or more aliases associated with the account, each of the one or more alias representing at least one of the one or more license plates. In some cases, the software module presenting the interface allowing the parking customer to select the one of the one or more license plates comprises presenting the interface allowing the parking customer to select the alias representing the one of the one or more license plates.

Disclosed herein, in certain embodiments, are pay stations comprising: a processor, a memory, a communications element, a printer, and a computer program including instructions executable by the processor to create an application comprising: a software module receiving a unique identifier associated with a customer, the customer having executed a mobile payment for an admission associated with the pay station; a software module transmitting the unique identifier to a central management server and querying the central management server with the unique identifier to identify the customer and verify the mobile payment; and a software module generating and sending instructions to the printer to print a payment verification for the customer. In some cases, the admission is for an event, an activity, service, or transportation. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator associated with the pay station. In some cases, the payment verification is a receipt. In some cases, the payment verification is an expense report. In some cases, the payment verification is a replacement receipt. In some cases, the payment verification is utilized in a pay-and-display regime. In some cases, the application further comprises a software module determining an advertisement appropriate for the customer. In some cases, the advertisement is determined based, at least in part by, the identity of the customer, a transaction history of the customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the customer.

Disclosed herein, in certain embodiments, are computer-implemented methods comprising: receiving, by a pay station, a unique identifier associated with a customer, the customer having executed a mobile payment for an admission associated with the pay station; transmitting, by the pay station, the unique identifier to a central management server; querying, by the pay station, the central management server with the unique identifier to identify the customer and verify the mobile payment; and printing, by the pay station, a payment verification for the customer. In some cases, the admission is for an event, an activity, service, or transportation. In some cases, the communications element is a wireless communications element. In some cases, the printer is a two-sided printer. In some cases, the unique identifier is a credit card, driver license, or license plate. In some cases, the unique identifier is a transaction identifier. In some cases, the unique identifier is an identifier associated with a mobile device of the customer. In some cases, the pay station receives a unique identifier via optical scanning, reading a magnetic strip, entry via a keypad, near field communication signal, or a combination thereof. In some cases, the mobile payment is made via Apple Pay, Samsung Pay, or Google Wallet. In some cases, the mobile payment is made via a dedicated mobile application provided by the manufacturer of the pay station or the operator associated with the pay station. In some cases, the payment verification is a receipt. In some cases, the payment verification is an expense report. In some cases, the payment verification is a replacement receipt. In some cases, the payment verification is utilized in a pay-and-display regime. In some cases, the application further comprises a software module determining an advertisement appropriate for the customer. In some cases, the advertisement is determined based, at least in part by, the identity of the customer, a transaction history of the customer, the location of the pay station, the time of day, the day of the week, current promotions offered by nearby vendors, or a combination thereof. In some cases, the advertisement is printed on the payment verification. In some cases, the advertisement is presented on a display of the pay station. In some cases, the advertisement is presented on a display of a mobile device of the customer.

Disclosed herein, in certain embodiments, are payment platforms comprising: at least one mobile processor configured to provide a mobile payment application comprising a software module executing a mobile payment for an admission; and a pay station comprising: a software module receiving a unique identifier associated with a customer, the customer having executed a mobile payment for the admission associated with the pay station via the mobile payment application; a software module transmitting the unique identifier to a central management server and querying the central management server with the unique identifier to identify the customer and verify the mobile payment; a software module determining an advertisement appropriate for the customer; and a software module generating and sending instructions to the printer to print a payment verification for the customer, the payment verification comprising the advertisement.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

Overview

Described herein, in certain embodiments, are parking pay stations, methods, and platforms for pay-by-plate, pay-by-phone, or other parking and pay regimes. In some cases, the parking pay stations herein include a sensor that can directly read or scan a unique identifier associated with the parking customer or his/her vehicle. Further information of the parking customer and his/her vehicle can be obtained based on the unique identifier and query to the central parking management sever, so that data entry at the parking pay station at the time of parking can be minimized. As a result, possible errors during manual information entry can be avoided. In some cases, the parking pay stations herein communicate with a central parking management sever so that easy, fast, and convenient payment may be executed at the central parking management sever using prepaid user account or pre-registered payment method so that the parking customer is not required to provide payment method at the pay station, hence, the parking pay stations disclosed herein significantly save time and reduce possible information breach than traditional pay stations. Alternatively, disclosed herein are mobile payments that can be easily executed at parking pay stations or other digital devices associated therewith. Parking enforcement can also be greatly simplified without manual checking of payment verification on individual dashboards. Instead, the payment and parking information associated with each parked vehicle are stored and management at the central parking management sever, and the operator may easily scan license plates with hand-held device that communicates with the management sever to identify payment or non-payment of parked vehicles.

In some cases, the parking pay stations, methods, and platforms herein includes a central parking management server with which parking users can create an account that also includes the license plates they own. Optionally, the parking user may also register credit card or other information with the central server to be linked to the license plate(s) they own. In some cases, when a parking user swipes a card or enters a registered account at a parking station, the parking pay station communicate with the central parking management system, optionally for payment authorization, and for searching and locating existing account registered. In some cases, any license plates linked to the registered account of the user may be displayed on the screen for the user to select. In some embodiments, the actual license plates may be replaced by user-defined alias so that the user do not need to remember or select the license plate number at the pay station but only the easy-to-remember alias. Therefore, paying is made easier, faster, and more convenient and mistakes in manual data entry are also prevented. The parking pay stations, methods, and platforms herein also advantageously provide a printed payment verification to the user which is not possible with traditional mobile payments. Further, the pay stations, methods, and platforms herein can be easily adapted for use in payment for events, activities, services, or admissions other than parking so that payments for various admissions are easier and more convenient than traditional payments.

Unique Identifier

In some cases, the pay stations, methods, and platforms disclosed herein include a unique identifier. In some cases, the unique identifier may be input at the parking pay station via a sensor or user interaction with an input device.

In some cases, the unique identifier may be used to provide identification of the parking customer or identification of an account associated with the parking customer, optionally with the central parking management system/server. In some cases, such unique identification may be used locally or transmitted to a remote device for identification of a parking customer. For example, the unique identifier may be a credit card, debit card, or driver's license of the user. After parking pay station reads the unique identifier, the information of the unique identifier may be transmitted to the central management server for identification of the parking customer and additional information associated therewith. Alternatively, the unique identifier may be an account or a user ID of the parking customer, optionally in the parking management system, or with a third-party. As an example, the user may enter a Chase QuickPay account, a Facebook account, an Apple account, a PayPal account or any other commonly available account with a third party so that the user can be identified through communication with a corresponding third party.

In some cases, the unique identifier may be used to provide a method of payment for execution of a payment, or the like. As a non-limiting example, the unique identifier is a credit card, a mobile payment microchip, an ATM card, or a PayPal account, such method of payment may be identifiable and executable either at the local pay station or at the central parking management server.

In some cases, the unique identifier may be used to provide information related to parking. As a non-limiting example, the unique identifier may be a license plate of a vehicle of the parking user. As another example, the unique identifier may be a VIN number of a vehicle. As such, reading or scanning of the unique identification may provide information of the parked vehicle.

In some cases, one or more license plates are associated with an alias. In some embodiments, the alias is provided or selected by the user so that the user can easily select one or more license plates by selecting one or more aliases, each uniquely associated with a license plate. In some cases, the alias is stored within the user's account. In some cases, when the systems, methods, and media present an interface allowing a customer to select the one of the one or more license plates, the interface also allows the user to select the alias representing the one of the one or more license plates, either without presenting the license plate(s) or presenting in combination of the license plate(s). In some embodiments, the alias is In some cases, communication of the one or more license plate herein via a communications element includes communication of one or more aliases associated with the account, each of the one or more aliases representing at least one of the one or more license plates. In some embodiments, the communication includes transmission, receiving, or both. For example, the communication may be between a payment station and a central management server.

In some cases, the unique identifier may be an RFID tag that includes information of the parking customer or the vehicle(s) of the customer, for example, the license plate information, which could be shared with the parking pay station, and optionally the central management server, via an RFID reader.

Non-limiting examples of the unique identifier include but is not limited to: a credit card, a debit card, an ATM card, a driver's license, a VIN number, a license plate number, a passport, facial, retinal or biometric data, including but not limited to finger print, palm print or voice print, an account with a central parking management system, an account with a third party, a user ID, a RF ID, a microchip, a magnetic strip, a social security number, an email address, a phone number, a name, or other available information of the parking customer. In some cases, a combination of different unique identifier is required.

In some embodiments, the unique identifier herein may be for payment of various admissions other than parking.

In some cases, a parking customer self-declares or proves his or her identity by using facial data, retinal data, finger print data, palm print data, biometric data, or other biological data of the parking customer (hereinafter "biological identification information"). In some cases, the parking customer first creates a digital abstraction of his or her biological identification information to represent an identity of the parking customer. In some cases, the digital abstraction is created to incorporate biometrics of the parking customer as well as another form of personal identifier (e.g., non-biology-based unique identifier, or a personal password). In some cases, the biological identification information is in a digital form, such as, for example, an electronic signature, a digital finger print, a digital palm print, a digital iris scan, a digital retina scan, a digital facial portrait, a digital skin texture, a voice print, a gait characteristic, or even a DNA digitally captured. The biological identification information represents unique personal traits of the parking customer. In some cases, the digital form of the biological identification information is subject to additional encryption (e.g., a personal password) or another form of verification (e.g., a text message, a phone call, an email message, etc.) to prevent tampering or identity theft. In other cases, the digital form of the biological identification information is embedded as a digital watermark in a digital portrait of the parking customer. In some cases, one type of digital form of the biological identification information is embedded in another type of the digital form of the biological identification information to provide more stringent authenticity. In some cases, the digital form of the biological identification information is self-captured by the parking customer. In some cases, after the digital abstraction is created to represent the digital form of the biological identification information of the parking customer, when the digital form of the biological identification information is lost or stolen, the parking customer has the ability and means to revoke the breached digital form. The revocation is immediately effective within the authenticated platform/system according to previously agreed upon conditions and procedures.

Parking Pay Stations

In some cases, the parking pay station is for multiple parking spaces. In further cases, the number parking space may be any number greater than 1. In some cases, the parking space may be greater than about 20, 50, or 100. In further cases, the parking space does not include a unique parking space identifier. In further cases, the parking customer does not need to indicate a parking space identifier at the parking pay station for parking and/or payment of parking.

In some cases, the parking pay station includes a user interface that allows a parking customer to interact with the parking pay station. In further cases, the user may interact with an input device at the user interface.

In some cases, the parking pay station includes a digital display. In some cases, the parking pay station includes a power source. In further cases, the power source is renewable or rechargeable. In some cases, the pay station includes an electronic user interface. In some cases, the parking pay station includes a printer.

In some embodiments, the pay station is optionally connected to a computer network. In further embodiments, the pay station is optionally connected to the Internet such that it accesses the World Wide Web. In still further embodiments, the pay station is optionally connected to a cloud computing infrastructure. In other embodiments, the pay station is optionally connected to an intranet. In other embodiments, the pay station is optionally connected to a data storage device.

In some embodiments, the pay station includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the pay station includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 4:
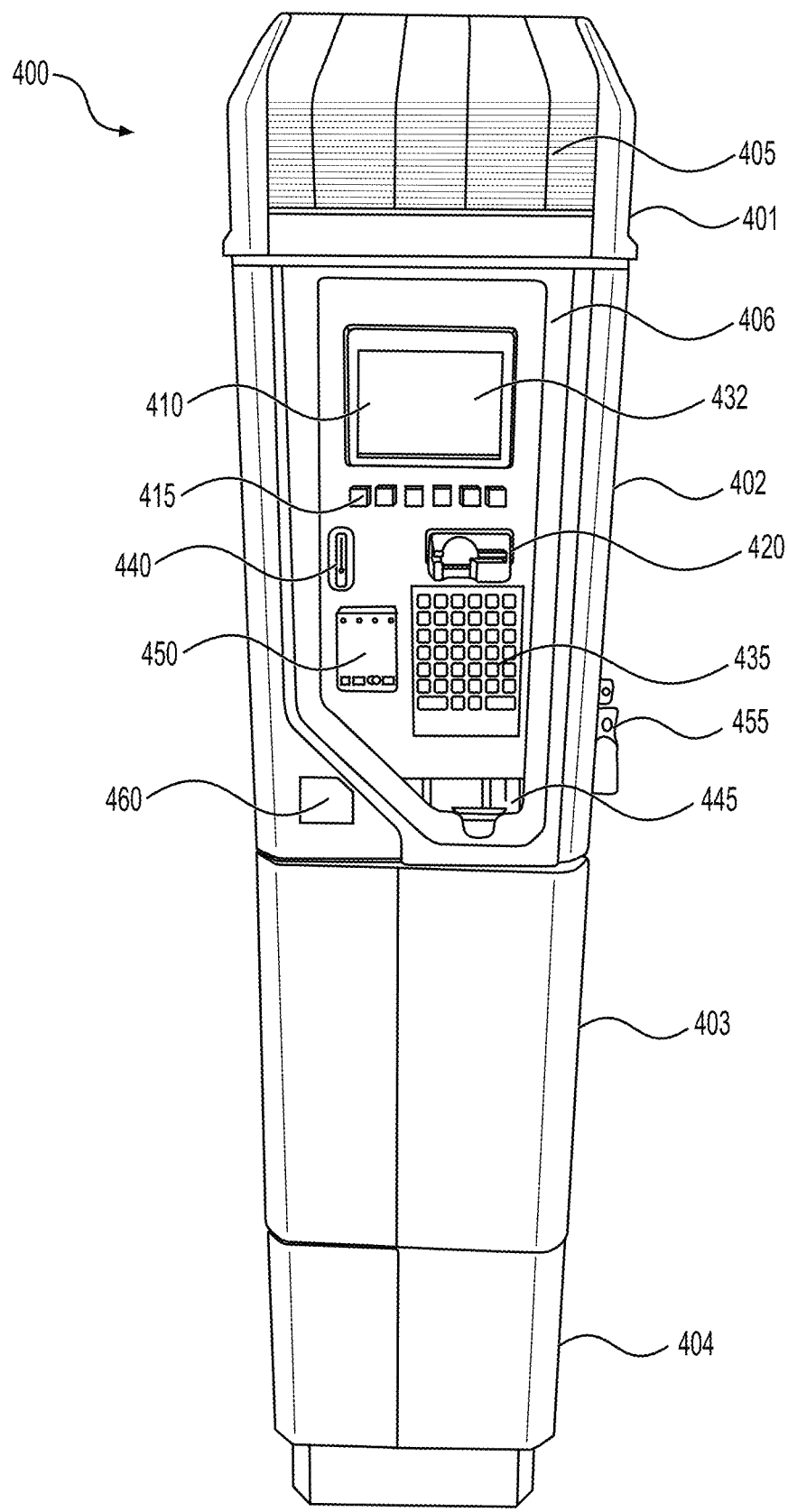
FIG. 4 shows a non-limiting front view of a multispace parking pay station 400.

Referring to FIG. 4, in a particular embodiment, a multispace parking pay station 400 comprises multiple modules, such as, a first module 401, a second module 402, a third module 403, and a fourth module 404, shown in FIG. 4 as from the top to bottom, respectively. The first module 401 comprises a solar panel 405 and provides energy to the multispace parking pay station 400. A battery (not shown) can provide additional energy to the multispace parking pay station 400 as well. The battery can be charged by the solar panel 405. The second module 402 comprises a front panel 406, a display 410, an intuitive keypad 415, a card reader 420, an input keypad 435, a coin slot 440, a printer 445, a tap-to-pay display 450, a lock-and-key mechanism 455, and a sensor 460.

The display 410 sends visual information to a user. When entering commands after prompted by instructions displayed on the display 410 or via a speaker (not shown), the use uses the intuitive keypad 415 to interact with the multispace parking pay station. In some cases, the display 410 further comprises a touch screen 432 that allows the user to interact with the multispace parking pay station 400. The card reader 420 reads the magnetic strip (or other information providing device) on a credit or debit card or other types of cards that can be swiped. The card reader 420 is electrically linked to a processor (not shown) to provide information therefor in respect of whether payment has been made. The user can also use the input keypad 435 to interact with the multispace parking pay station 400, for example, to enter personal identification number (e.g., a unique identifier) or zip code associated with the credit card or the user.

Payment forms other than credit or debit card are allowed by the multispace parking pay station 400. The coin slot 440 accepts coin. The tap-to-pay display 450 is a contactless device reader that enables tap-to-pay payment options. The tap-to-pay display 450 enables and performs a payment transaction using a contactless element. In some cases, a payment device is presented to the tap-to-pay display 450 prior to initiation of a transaction, during a transaction, or subsequent to a transaction, with the payment device being presented in one or more of these situations. In other cases, presenting the payment device is used to launch a payment application, enable a transaction, to provide transaction data to the payment device, or to re-set or configure a function or operation of the payment application or the payment device. In the context of the tap-to-pay payment transaction, presenting the payment device to the tap-to-pay display 450 is referred to as a "tap", where a "tap" includes any action by a user that enables the communication between the user's payment device and the tap-to-pay display 450 using a near field or short range communications mechanism (including waving the payment device near the tap-to-pay display 450, placing the payment device against the tap-to-pay display 450, etc.). The payment device in the context of tap-to-pay can be a credit card, a debit card, a smart card, a mobile device including a mobile phone, a smart phone, and a tablet, or a computer.

The printer 445 prints out a payment receipt after the payment transaction is complete, or other printing jobs associated with using the multispace parking pay station 400, including printing out advertisement at the user's choice. The multispace parking pay station 400 can use the sensor 460 to perform various functions, including, for example, detecting a user within the vicinity of the parking pay station, reading license plate numbers, detecting a mobile device, etc.

The lock-and-key mechanism 455 secures the multispace parking pay station 400 and reduces the risk of vandalism including the theft of coins or other items from the inside of the multispace parking pay station 400.

Other components, such as, the battery, a processor, a memory, and a communication element (including an antenna if the communication element is wireless), can be placed in any of the four modules 401-404.

Figure 5:
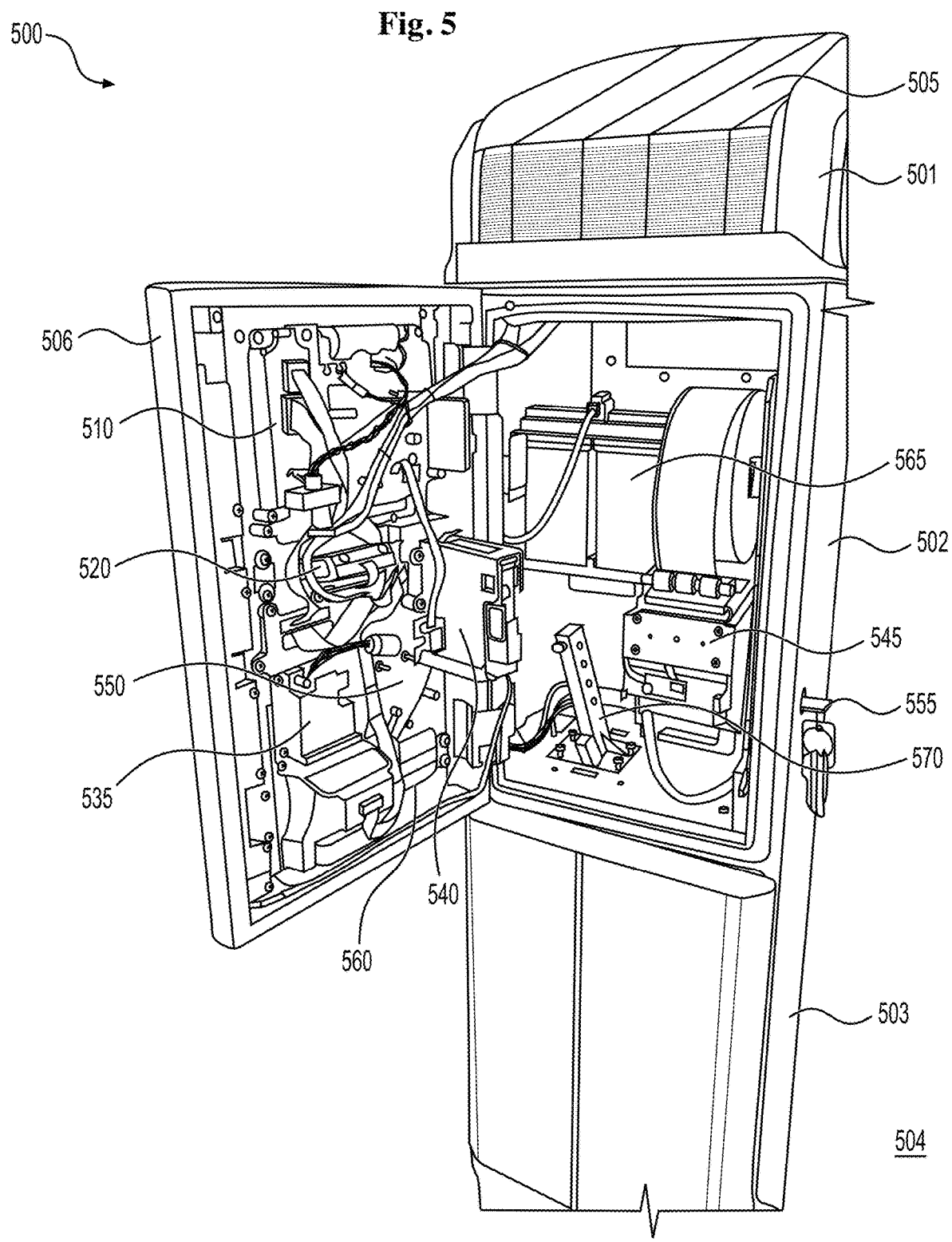
FIG. 5 shows a non-limiting perspective, partial, front view of a multispace parking pay station 500.

Referring to FIG. 5, in a particular embodiment, a multispace parking pay station 500 comprises multiple modules, such as, a first module 501, a second module 502, and a third module 503, shown in FIG. 5 as from the top to the bottom, respectively. The first module 501 comprises a solar panel 505 and provides energy to the multispace parking pay station 500. A battery (not shown) can provide additional energy to the multispace parking pay station 500 as well. The battery can be charged by the solar panel 505. The second module 502 comprises a front panel A 506 that is locked by the lock-and-key mechanism 555. When unlocked by an authorized person, such as a maintenance worker, the front panel A 506 can be opened and the various mechanisms within the second module 502 can be checked, replaced, or repaired, if necessary.

Within the second module 502 and on the back of the front panel A 506, there are a display mechanism 510, an intuitive keypad mechanism 515 (not shown, can be part of the display mechanism 510), a card reader mechanism 520, an input keypad mechanism 535, a coin collection mechanism 540, a tap-to-pay mechanism 550, and a sensor 560.

Within the second module 502, there is a battery 565, a printer 545, and a coin chute 570 leading to the third module 503.

The lock-and-key mechanism 555 secures the multispace parking pay station 500 and reduces the risk of vandalism including the theft of coins or other items from the inside of the multispace parking pay station 500

Still referring to FIG. 5, the display mechanism 510 sends visual information to a user on a display located on the other side of the front panel A 506. When entering commands after prompted by instructions displayed on the display or via a speaker (not shown), the use uses the intuitive keypad controlled by the intuitive keypad mechanism 515 to interact with the multispace parking pay station 500. The card reader mechanism 520 reads the magnetic strip (or other information providing device) on a credit or debit card or other types of cards that can be swiped. The card reader mechanism 520 is electrically linked to a processor (not shown) to provide information therefor in respect of whether payment has been made. In addition, the user can also use an input keypad controlled by the input keypad mechanism 535 to interact with the multispace parking pay station 500. For example, the user can use the input keypad to enter personal identification number (e.g., a unique identifier) or zip code associated with the credit card or the user.

Payment forms other than credit or debit card are allowed by the multispace parking pay station 500. The coin collection mechanism 540 accepts coin and drops the collected coins via the coin chute 570 into a coin box (not shown). The printer 545 prints out a payment receipt after the payment transaction is complete, or other printing jobs associated with using the multispace parking pay station 500, including printing out advertisement at the user's choice.

Other components, such as, the battery, a processor, a memory, and a communication element (including an antenna if the communication element is wireless), can be placed in any of the three modules 501-504 or another module (not shown).

Figure 6:
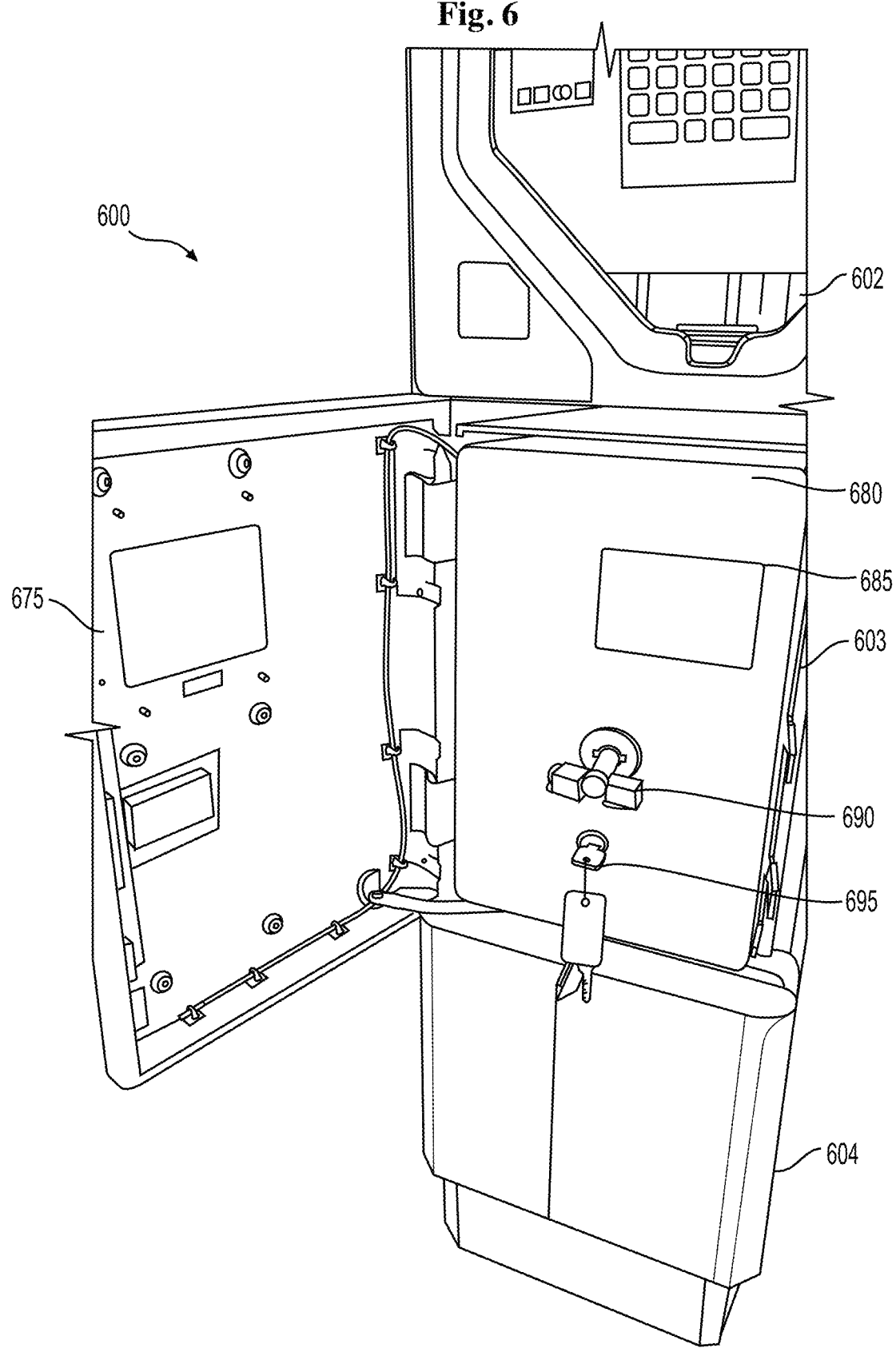
FIG. 6 shows a non-limiting perspective, partial, front view of another multispace parking pay station 600.

Referring to FIG. 6, in a particular embodiment, a multispace parking pay station 600 comprises multiple modules, such as, a second module 602, a third module 603, and a fourth module 604 shown in FIG. 6 as from the top to the bottom, respectively. The third module 603 comprises a front panel B 675, which can be locked by a lock-and-key mechanism (not shown) of the multispace parking pay station 600. FIG. 6 shows a partial view when the front panel B 675 is open and a coin cabinet 680 is accessible inside the third module 603. The coin cabinet 680 comprises a coin cabinet door 685. The coin cabinet door 685 comprises a coin cabinet handle 690 and a coin cabinet lock-and-key mechanism 695. After the coin cabinet lock-and-key mechanism 695 unlocks the coin cabinet door 685, the coin cabinet handle 690 allows an authorized person, such as a payment collector, to access the coin box (not shown).

Figure 7:
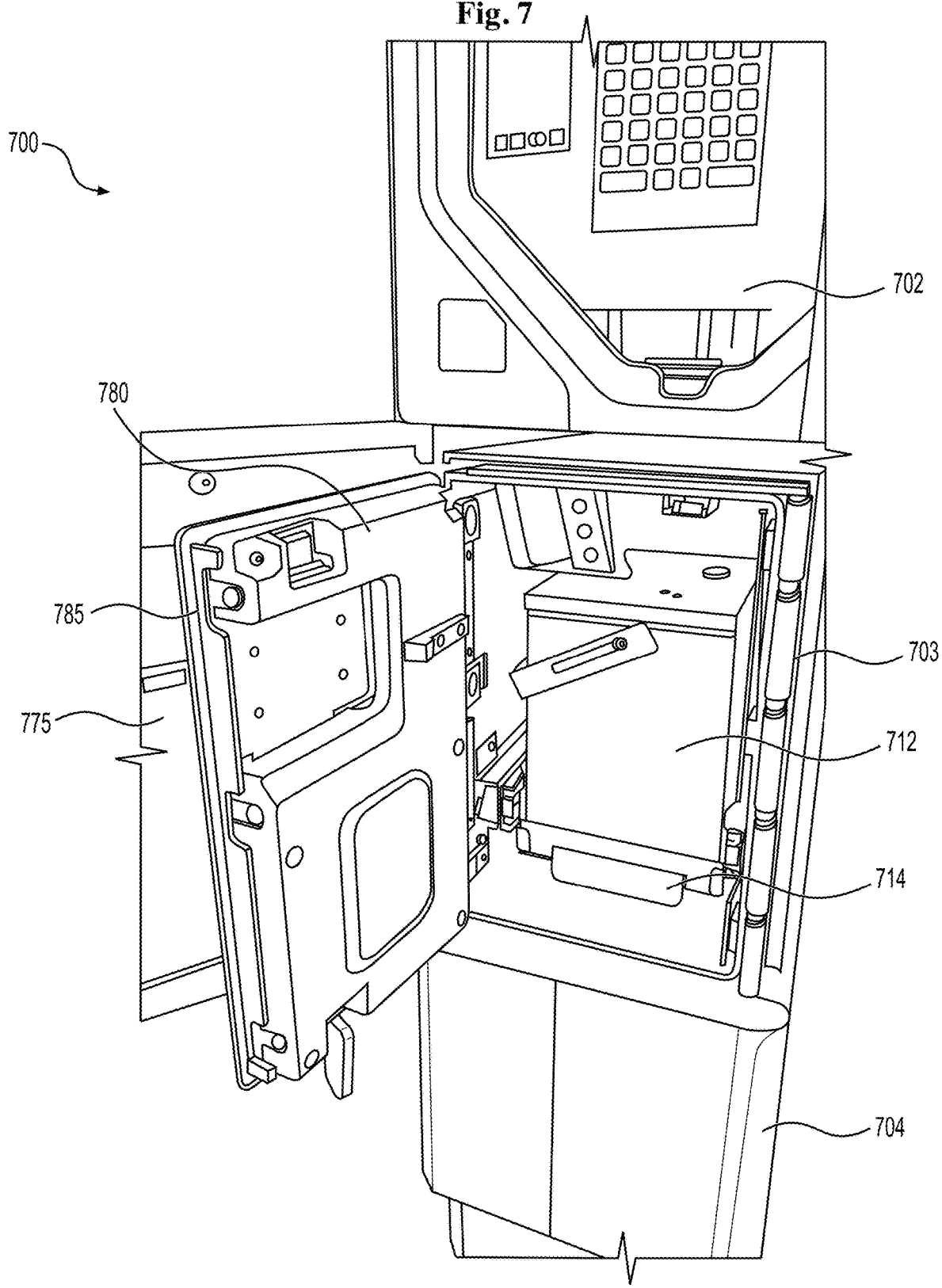
FIG. 7 shows a non-limiting perspective, partial, front view of still another multispace parking pay station 700.

Referring to FIG. 7, in a particular embodiment, a multispace parking pay station 700 comprises multiple modules, such as, a second module 702, a third module 703, and a fourth module 704 shown in FIG. 7 as from the top to the bottom, respectively. The third module 703 comprises a front panel B 775, and a coin cabinet 780 whose coin cabinet door 785 can be unlocked by a coin cabinet lock-and-key mechanism (not shown). FIG. 7 shows a partial view when the coin cabinet door 785 is open and a coin box 712 is accessible inside the coin cabinet 780. The coin box 712 is held by a coin box tray 714 which can be slid into and out of the coin cabinet 780, thereby allowing an authorized person, such as a payment collector, to remove the coin box 712. In FIG. 7, the coin box 712 remains mostly inside the coin cabinet 780.

Figure 8:
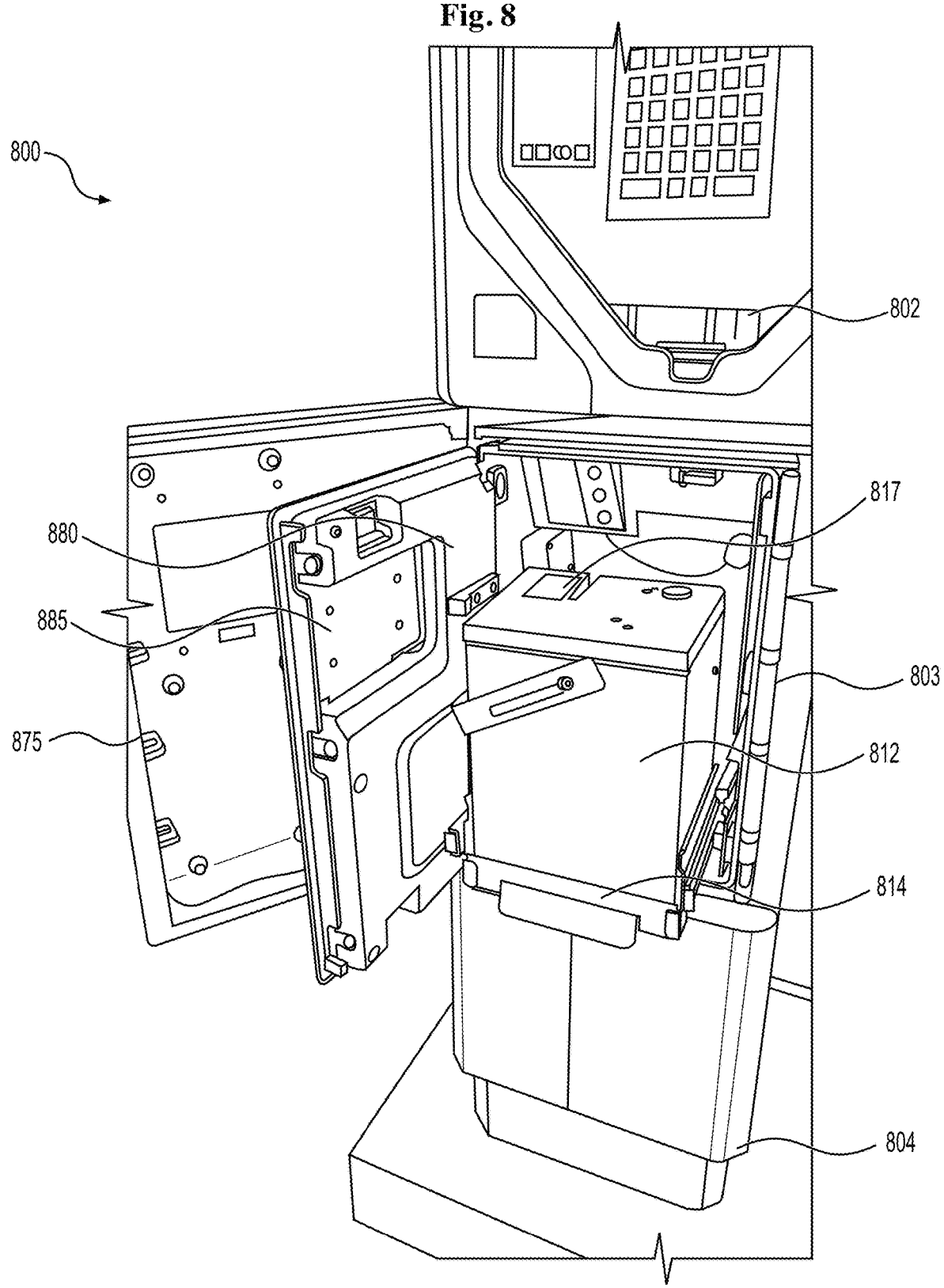
FIG. 8 shows a non-limiting perspective, partial, front view of a multispace parking pay station 800.

Referring to FIG. 8, in a particular embodiment, a multispace parking pay station 800 comprises multiple modules, such as, a second module 802, a third module 803, and a fourth module 804 shown in FIG. 8 as from the top to the bottom, respectively. The third module 803 comprises a front panel B 875, and a coin cabinet 880 whose coin cabinet door 885 can be unlocked by a coin cabinet lock-and-key mechanism (not shown). FIG. 8 shows a partial view when the coin cabinet door 885 is open such that a coin box 812 is accessible and is slid partially out of the coin cabinet 880. An RFID tag 816 (not shown) is placed on a side of the coin box 812 such that when an RFID reader (not shown) reads the RFID tag 816, the RFID reader can record information such as which coin box has been removed, and which coin box has been re-entered. Further, the RFID reader can record other information such as the amount and values of coins in the detected coin box, or whether the coin box is malfunctioning. The recorded information can be communicate to a remote server, or an authorize person, such as a payment collector. The coin box 812 is held by a coin box tray 814 which can be slid into and out of the coin cabinet 880, thereby allowing an authorized person, such as a payment collector, to remove the coin box 812. In FIG. 8, the coin box 812 is partially outside the coin cabinet 880. A coin entry 817 is visible in FIG. 8. The coin entry 817, together with a coin collection mechanism and a coin chute, enables the collection of coins and the calculation of payment by the collected coins.

Figure 9:
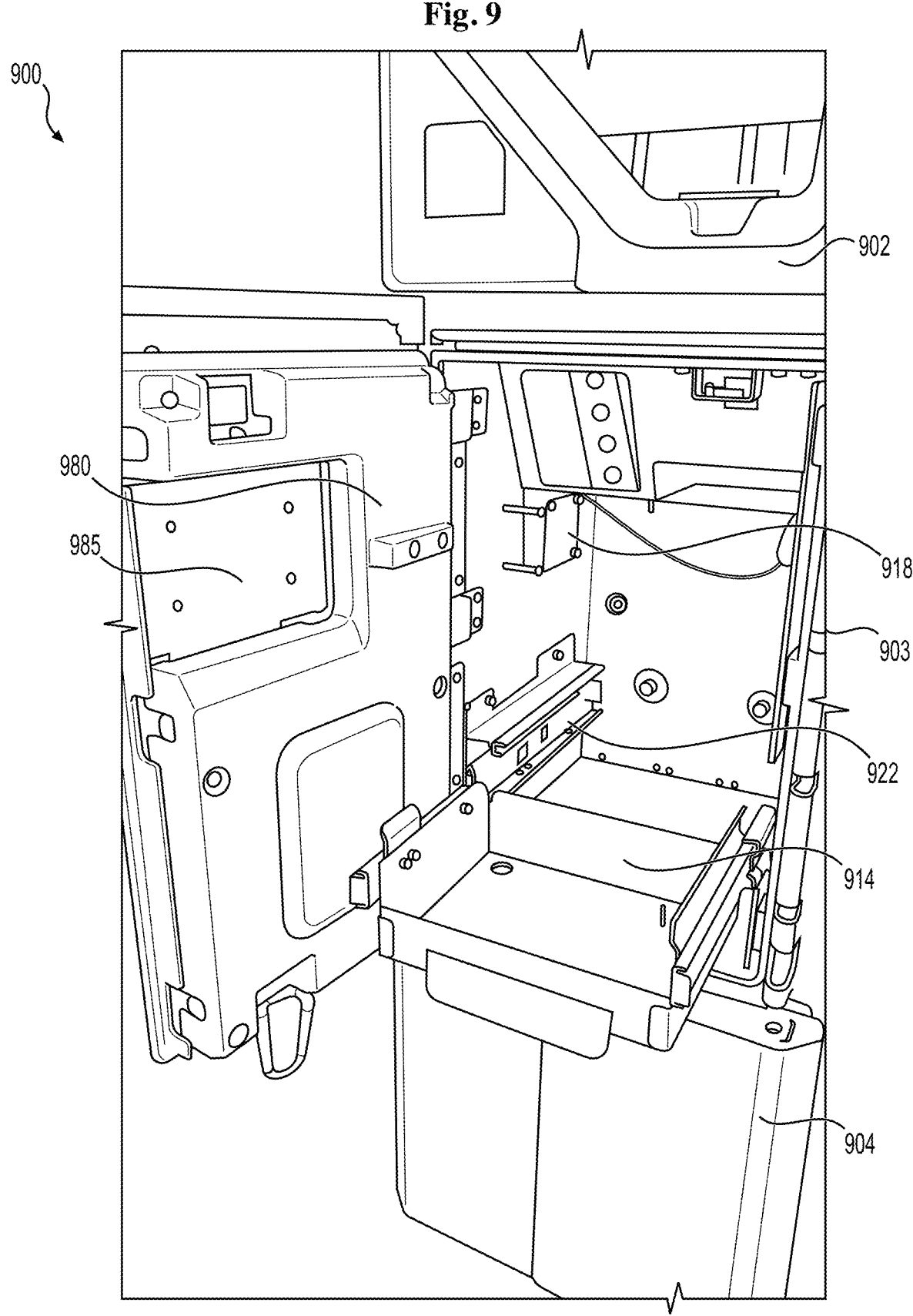
FIG. 9 shows a non-limiting perspective, partial, front view of another multispace parking pay station 900.

Referring to FIG. 9, in a particular embodiment, a multispace parking pay station 900 comprises multiple modules, such as, a second module 902, a third module 903, and a fourth module 904 shown in FIG. 9 as from the top to the bottom, respectively. The third module 903 comprises a coin cabinet 980 whose coin cabinet door 985 can be unlocked by a coin cabinet lock-and-key mechanism (not shown). FIG. 9 shows a partial view when the coin cabinet door 985 is open and a coin box (not shown) has been removed from the coin cabinet 980. The coin box is held by a coin box tray 914 which can be slid into and out of the coin cabinet 980, thereby allowing an authorized person, such as a payment collector, to remove the coin box. In FIG. 9, the coin box has been removed from the cabinet 980 and a coin box try sliding track 922 is visible. The coin box try sliding track 922 allows the coin box tray sliding into and out of the coin cabinet 980. Further, on the inside of the coin cabinet 980 is an RFID reader 918, which can read an RFID tag attached to removed coin box (not shown).

Figure 10:
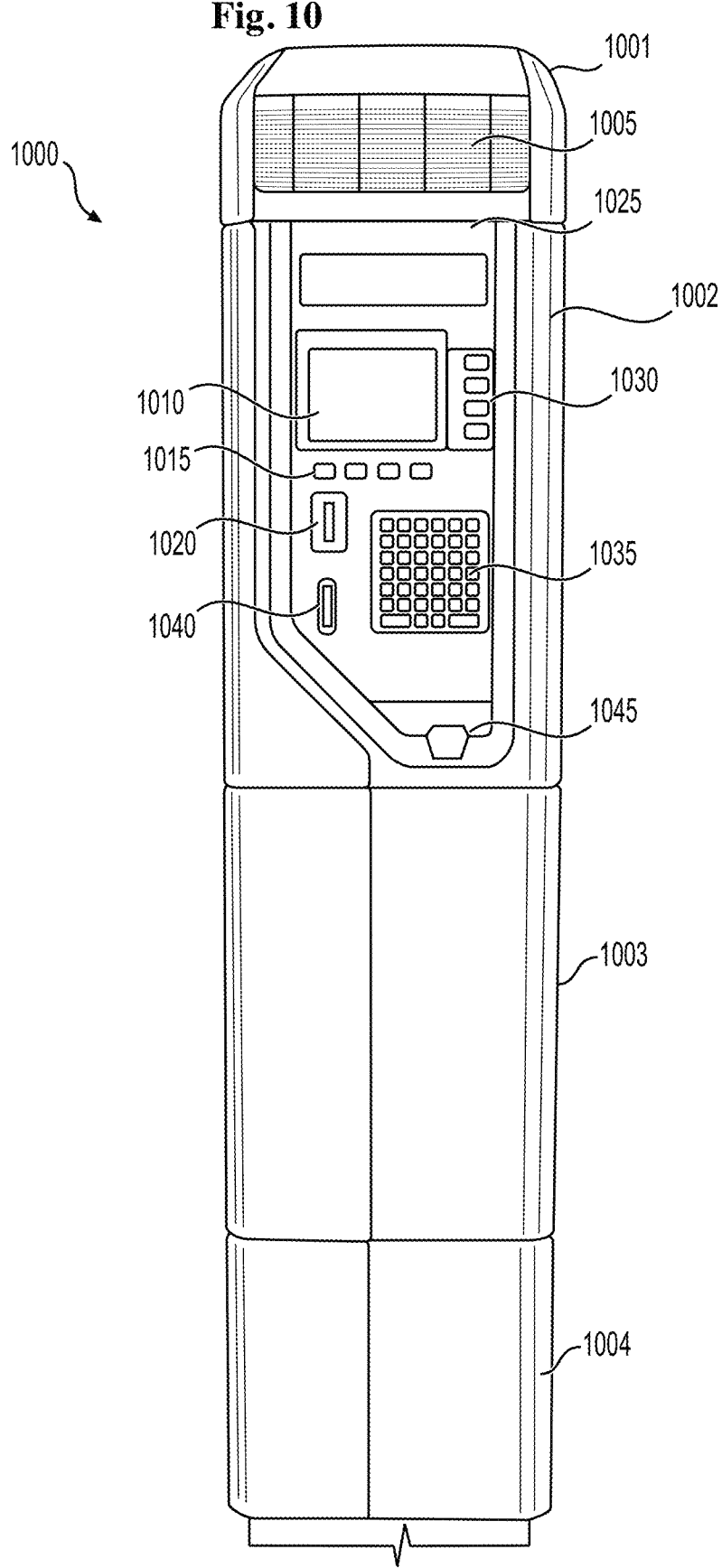
FIG. 10 shows a non-limiting front view of another multispace parking pay station 1000.

Referring to FIG. 10, in a particular embodiment, a multispace parking pay station 1000 comprises multiple modules, such as, a first module 1001, a second module 1002, a third module 1003, and a fourth module 1004, shown in FIG. 10 as from the top to bottom, respectively. The first module 1001 comprises a solar panel 1005 and provides energy to the multispace parking pay station 1000. A battery (not shown) can provide additional energy to the multispace parking pay station 1000 as well. The battery can be charged by the solar panel 1005. The second module 1002 comprises a display 1010, an intuitive keypad 1015, a card reader 1020, an LED lighting 1025, a selection key pad 1030, an input keypad 1035, a coin slot 1040, and a printer 1045.

The display 1010 sends visual information to a user. When entering commands after prompted by instructions displayed on the display 1010 or via a speaker (not shown), the use uses the intuitive keypad 1015 to interact with the multispace parking pay station. The card reader 1020 reads the magnetic strip (or other information providing device) on a credit or debit card or other types of cards that can be swiped. The card reader 1020 is electrically linked to a processor (not shown) to provide information therefor in respect of whether payment has been made. In addition, the user can also use either the selection key pad 1030 or the input keypad 1035 to interact with the multispace parking pay station 1000. For example, the user can use the selection key pad 1030 when entering selection of choices shown on the display 1010, or use the input keypad 1035 to enter personal identification number (e.g., a unique identifier) or zip code associated with the credit card or the user.

Payment forms other than credit or debit card are allowed by the multispace parking pay station 1000. The coin slot 1040 accepts coin. The printer 1045 prints out a payment receipt after the payment transaction is complete, or other printing jobs associated with using the multispace parking pay station 1000, including printing out advertisement at the user's choice.

Other components, such as, the battery, a processor, a memory, and a communication element (including an antenna if the communication element is wireless), can be placed in any of the four modules 1001-1004.

Still referring to FIG. 10, the multispace parking pay station 1000 features a fully automatic, unattended payment device to collect parking payments and issue payment receipt, among other functions. Some benefits of the multispace parking pay station 1000 includes:

Flexibility: The multispace parking pay station 1000 is available in pay-by-space, pay and display, and pay-by-plate models, depending on the configuration of the parking pay station. With modular parts (e.g., modules 1001-1004), it's easy to swap to a different mode in the future, access only to one module (for example, repairing the second module 1002 without accessing the coin box in the third module 1003.

Unparalleled power efficiency: Environmentally-friendly solar panels and combination battery packs maximize ongoing power.

Customization: Configurable buttons (e.g., intuitive keypad 1015, selection keypad 1030) include help screens, alternative languages, max time, and more.

Robust hardware design: Highly-secure, stainless steel cabinet with weather and graffiti-resistant powder coating and scratch-resistant armored glass LCD display make it durable and easy to maintain.

Improved visibility: Blue LED lighting (e.g., LED lighting 1025) above the display 1010 provides enhanced visibility for motorists, technicians, and collections staff. Customer-friendly interface offers additional flexibility to complete a transaction in any order the user chooses.

Dependability: Wirelessly networked to a web-based SaaS management system. No additional communications hardware or software is required—3G/4G or 5G standard.

Easy maintenance: Modularly designed with the technician in mind for easy plug-and-play maintenance.

Secure collections: Unit contains separate maintenance cabinet (e.g., the second module 1002) and collection vault (e.g., the third module 1003 which contains a coin box (not shown)). The cash box is housed in a secure vault that features a six-point locking system and high-security lock (not shown).

Future-proof design: The open interface provides seamless integration with third-party systems, such as enforcement, permitting, and ANPR (automatic number plate recognition).

Additional payment options: It can be upgraded to contactless payment and/or EMV-approved card readers. EMV stands for "Europay, MasterCard and Visa," which is a global standard for chip-based Debit and Credit Card transactions. It is a joint effort between Europay, MasterCard and Visa to ensure security and global acceptance so that MasterCard and Visa Cards can continue to be used everywhere.

Other Technical Specifications:

Weight: 175 lbs.

Dimensions: 12.5"×12"×60" (31.75 cm×30.48 cm×152.4 cm); it is compliant with all relevant standards for disabled access.

Power: Solar (standard) or alternating current (AC).

Temperature range: −40° F. to 185° F. (−40° C. to 85° C.); Optional heater (AC units only).

Payment accepted: Credit and debit cards, smart cards, coins, tokens, pay-by-cell, smart payments through apps like Apple Pay and Android Pay, and optional bill notes.

Cabinet housing: Uni-body construction. High grade corrosion-resistant stainless steel treated and covered with weather and graffiti-resistant powder coating.

Locks: Cabinet is protected by a six (6) point secure locking system (e.g., a lock-and-key mechanism). The outer vault door locks are protected by anti-drill spin disks. Upper and lower housing require separate keys. The collection vault has a dual locking system with a T-bar. Electronic locks available upon request.

Display: Large monochromatic display screen is 320×240 pixels and allows for five lines of alpha-numeric or graphical messages. Display is protected by anti-glare coated armored glass (standard feature).

Printer: High-resolution graphic thermal printer allows for customizable graphics, vouchers, and barcodes, which are programmable from the Data Management System (DMS).

Coin box capacity: Two options for exchangeable coin box: 2450 coin capacity or 700 coin capacity. "Smart" sensing technology available in both coin box models.

Bill stacker (optional): 600 bill notes.

Figure 11:
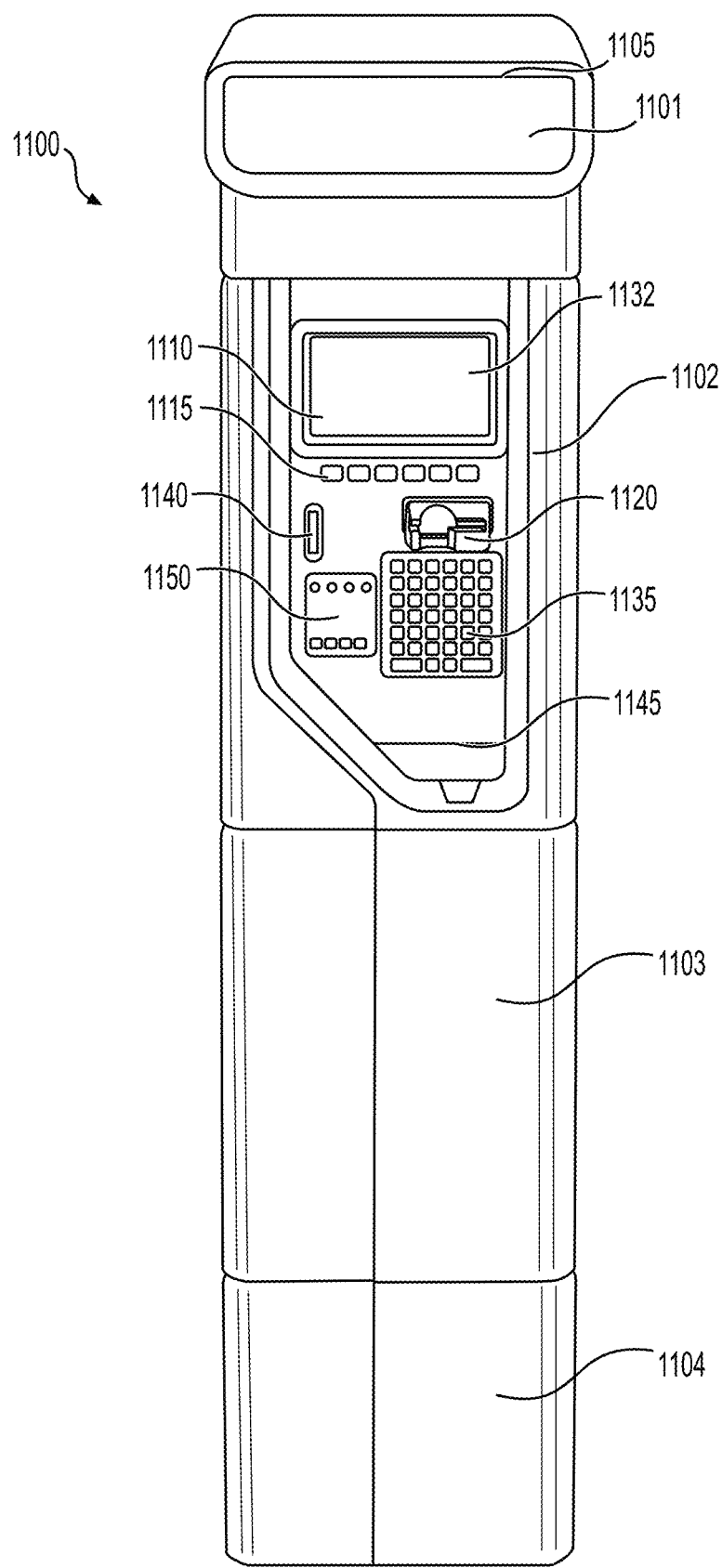
FIG. 11 shows a non-limiting front view of still another multispace parking pay station 1100.

Referring to FIG. 11, in a particular embodiment, a multispace parking pay station 1100 comprises multiple modules, such as, a first module 1101, a second module 1102, a third module 1103, and a fourth module 1104, shown in FIG. 11 as from the top to bottom, respectively. The first module 1101 comprises a solar panel 1105 and provides energy to the multispace parking pay station 1100. A battery (not shown) can provide additional energy to the multispace parking pay station 1100 as well. The battery can be charged by the solar panel 1105. The second module 1102 comprises a display 1110, an intuitive keypad 1115, a card reader 1120, an input keypad 1135, a coin slot 1140, a printer 1145, and a tap-to-pay display 1150.

The display 1110 sends visual information to a user. When entering commands after prompted by instructions displayed on the display 1110 or via a speaker (not shown), the use uses the intuitive keypad 1115 to interact with the multispace parking pay station. In some cases, the display 1110 further comprises a touch screen 1132 that allows the user to interact with the multispace parking pay station 1100. The card reader 1120 reads the magnetic strip (or other information providing device) on a credit or debit card or other types of cards that can be swiped. The card reader 1120 is electrically linked to a processor (not shown) to provide information therefor in respect of whether payment has been made. The user can also use the input keypad 1135 to interact with the multispace parking pay station 1100, for example, to enter personal identification number (e.g., a unique identifier) or zip code associated with the credit card or the user.

Payment forms other than credit or debit card are allowed by the multispace parking pay station 1100. The coin slot 1140 accepts coin. The tap-to-pay display 1150 is a contactless device reader that enables tap-to-pay payment options. The tap-to-pay display 1150 enables and performs a payment transaction using a contactless element. In some cases, a payment device is presented to the tap-to-pay display 1150 prior to initiation of a transaction, during a transaction, or subsequent to a transaction, with the payment device being presented in one or more of these situations. In other cases, presenting the payment device is used to launch a payment application, enable a transaction, to provide transaction data to the payment device, or to re-set or configure a function or operation of the payment application or the payment device. In the context of the tap-to-pay payment transaction, presenting the payment device to the tap-to-pay display 1150 is referred to as a "tap", where a "tap" includes any action by a user that enables the communication between the user's payment device and the tap-to-pay display 1150 using a near field or short range communications mechanism (including waving the payment device near the tap-to-pay display 1150, placing the payment device against the tap-to-pay display 1150, etc.). The payment device in the context of tap-to-pay can be a credit card, a debit card, a smart card, a mobile device including a mobile phone, a smart phone, and a tablet, or a computer.

The printer 1145 prints out a payment receipt after the payment transaction is complete, or other printing jobs associated with using the multispace parking pay station 1100, including printing out advertisement at the user's choice.

Other components, such as, the battery, a processor, a memory, and a communication element (including an antenna if the communication element is wireless), can be placed in any of the four modules 1101-1104.

Still referring to FIG. 11, the multispace parking pay station 1100 features a fully automatic, unattended payment device to collect parking payments and issue payment receipt, among other functions. It can comprise a touch screen to allow easy interactions between the parking pay station and the users. Some benefits of the multispace parking pay station 1100 includes Flexible: The parking pay station 1100 is available in pay-by-space, pay-and-display and pay-by-plate models. With modular parts (e.g., modules 1101-1104), it's easy to change modes when needed.

Customizable: Configurable buttons (e.g., intuitive keypad 1115) include: help screens, multiple-language options, plus or minus time, and more.

Upgradable: An existing parking pay station, such as, for example, the multispace parking pay station 1000, can be easily upgraded to the multispace parking pay station 1100.

Environmentally friendly: Combines solar-panels with battery back-up for maximum power efficiency. A great choice for Green Initiatives.

Environmentally strong: Highly secure, stainless steel cabinet with graffiti-resistant powder coating and scratch-resistant bonded LCD (e.g., the display 1110) is durable and easy to maintain. The multispace parking pay station 1100 can withstand vandals and extreme weather conditions.

Customer-friendly: The operation interface offers users the flexibility to complete transactions in the order they choose. Pay-by-plate automatically populates when users use PARK SMARTER™ mobile payments or their MY PARKING RECEIPT™ account.

Maintenance-friendly: Modularly designed with the technician in mind for easy plug-and-play maintenance.

Security and peace-of-mind: Each unit contains separate maintenance cabinet (e.g., the second module 1102) and collection vault (e.g., the third module 1103 which contains a coin box (not shown)). The cash box is housed in a secure vault that features a six-point locking system and a high-security lock, protected from thieves and nesting insects and animals.

Future-proof Design: The open operational interface provides seamless integration with enforcement, permitting, and LPR (license plate recognition).

Additional payment options: Upgradable to contactless payment and/or EMV-approved card readers. EMV stands for "Europay, MasterCard and Visa," which is a global standard for chip-based Debit and Credit Card transactions. It is a joint effort between Europay, MasterCard and Visa to ensure security and global acceptance so that MasterCard and Visa Cards can continue to be used everywhere.

Other Technical Specifications:

Weight: 175 lbs.

Dimensions: 12.5"×12"×60" (31.75 cm×30.48 cm×152.4 cm); multispace parking pay station 1100 is compliant with all relevant standards for disabled access.

Power: Solar (standard) or AC.

Temperature Range: −40° F. to 185° F. (−40° C. to 85° C.); Optional heater (AC units only).

Payment Accepted: Credit and debit cards, smart cards, coins, tokens, pay-by-cell, smart payments through apps like Apple Pay and Android Pay, and optional bill notes.

Cabinet Housing: Uni-body construction. High grade corrosion-resistant stainless steel treated and covered with weather and graffiti-resistant powder coating.

Locks: Cabinet is protected by a six (6) point secure locking system. The outer vault door locks are protected by anti-drill spin disks. Upper and lower housing require separate keys. The collection vault has a dual locking system with a T-bar. Electronic locks available upon request.

Display: Large color, touch screen (optional), multi-language is 800×480 pixels and allows for alpha-numeric or graphical messages. Display is protected by anti-glare coated bonded glass (standard feature).

Printer: High-resolution graphic thermal printer allows for customizable graphics, vouchers, and barcodes, which are programmable from the Data Management System (DMS).

Coin Box Capacity: Two options for exchangeable coin box: 2450 coin capacity or 700 coin capacity. "Smart" sensing technology available in both coin box models.

Bill Stacker (optional): 600 bill notes.

Sensors

In some cases, the parking pay stations, methods, and platforms disclosed herein include a sensor or use of the same. In some cases, the sensor is used for detection, identification, or recognition of a unique identifier provided by the user, or equivalently, the parking customer. In some cases, the sensor is used for detection, identification, or recognition of information input by the user. In some cases, the sensor is used for executing a payment, for example, a mobile payment.

In some cases, the sensor is a camera, a RF ID reader, a barcode reader, a magnetic strip reader, an infrared sensor, a capacitance, resistance, or inductance sensor, a pressure sensor, a thermal sensor, a near field communication detector, a microchip reader, a keypad, a virtual keyboard, a touch screen, an inertial sensor, an input device, or any other sensors that are commonly available.

In some cases, the sensor is a camera. In some cases, the camera captures images or videos) of objects, including but not limited to, parking users, customers or payee at the parking pay station, pedestrians, parked vehicles, moving vehicles, police officers, maintenance workers, missing persons, fugitives, and vandals. The captured images or videos are called camera data. In some cases, a computer network or a network communications element is configured to transmit camera data via the computer network or the network, and the application further comprises a software module performing biometric recognition on the camera data to determine the identity of the objects in the camera data. In some cases, the application further comprises a software module applying one or more computer vision algorithms to the camera data to determine one or more characteristics of the objects in the camera data. In some cases, the camera data are used to aid in the detection of vehicles, the detection of vandalism, the identification of criminals/vandals/parking users/customers/payees/missing persons/police officers/maintenance workers, or the biometric/facial recognition of the customers/payees at the parking pay station when they are making payments via the parking pay station. In some cases, the camera is integrated with other functions of the parking pay station. In certain cases when the parking pay station displays an advertisement either on a display screen or a speaker, the camera concurrently capture some camera data about the objects (i.e., people who may be watching or listening to the advertisement) in the vicinity of the display screen or the speaker. In some cases, the camera data are analyzed by the application to determine the effects of the display advertisement on the objects. In certain cases, the results of the analysis by the application comprise: the number of objects receive the advertisement, the reactions of the objects toward the advertisements. In some cases, the demographics of the objects who viewed/heard the advertisement are analyzed and correlated with the contents of the advertisement. In certain case, the analysis shows that different demographic groups react differently to the same advertisement. In other cases, the analysis shows that different demographic groups react similarly to the same advertisement. In some cases, the results of the analysis are used to improve the reception of the advertisement. In some cases, the application comprises artificial intelligence, big-data, and/or machine-learning sub-programs. In some cases, the camera data are analyzed to identify suspects for crimes or other type of misconducts, wanted fugitives, or missing persons. In certain cases, the application uses the artificial intelligence and facial recognition sub-program to identify people of interest.

In some cases, the sensor is physically located on a parking pay station. In some cases, the sensor is located on another device which communicates with the parking pay station. As an example, the sensor may be on a hand-held device so that an operator of the parking facility can carry to scan license plates of the parked vehicles for enforcement.

In some cases, the sensor may need to be in contact or in close vicinity to the unique identifier (for example, within 1 cm) in order to properly function. In alternative cases, the sensor may remotely sense a unique identifier from greater than about 1, 5, 10, or even 50 meters in distance.

In some cases, the sensor may be capable of sensing a unique identifier under different light condition or weather conditions.

In some embodiments, the pay stations herein include a processor, a digital processing device, or use of the same.

Communications Elements

In some cases, the pay stations, methods, and platforms disclosed herein include a communications element. In some cases, the central parking management server, the hand-held device, or other target devices herein include a communications element. Such communications elements enable data transmission among different devices. Such data includes any information pertaining to the pay stations, methods, and platforms disclosed herein. Non-limiting example of such data may include but is not limited to information of the parking customer, the vehicles of the parking customer, payment, method of payment, payment verification, payment reminder, advertisement, or a combination thereof. Additionally such communications elements enable transmission of various commands, queries, request, or responses among different devices. For example, the pay station may send a query to the central parking server with the user's driver's license via the communications element to check if the user has a pre-paid account or not. As another example, a hand-held device may send a request to the central parking server with a license plate to check payment or nonpayment of the license plate.

In some cases, such element is a wireless communications element, a wired communication element, or both. Non-limiting examples of the wireless communication elements include a Bluetooth element, a WIFI element, a satellite element, a microwave element, Infrared (IR) element, a ZigBee element, a mobile phone network, or a broadcast element.

In some cases, such communications element is used for communication, either unidirectional or bi-directional. In some cases, such communication is among hand-held devices of parking operators, pay stations, the central sever, and other third party devices.

In some cases, the communications element communicates directly with other target devices without the need for any intermediate devices. In alternative cases, the communications element communicates indirectly with other target devices via an intermediate device. As an example, the communications element of the parking pay station may transmit or receive signals from a base station or a satellite and then the base station or satellite transmits or receives signal a central parking management sever or a remote digital device.

Central Parking Management Servers

In some cases, the central parking management server herein communicates with one or more parking pay stations, one or more hand-held devices of the operator, and/or third party devices. In some cases, such server includes a processor, a digital processing device, an operation system, a communications element, a power source, a database, a memory, and a computer program including instructions executable by the processor to create a central parking management system/application. In some cases, the central parking management system/application includes a database.

In some cases, the central parking management system or sever enables storage and retrieval of information related to parking customers and parking pay stations. In further cases, the central parking management system or sever stores an account of the parking customer, which may be uniquely associated with an account number or other information of the parking customer. In further cases, such account may be pre-paid so that payment may not be required on site when there is balance left in the prepaid account to save time. As such possible errors and security breaches that may occur during payment on site are eliminated.

In some cases, the central parking management system or sever communicate with the parking pay stations and other third party devices. In some cases, the central parking management system or sever communicate with hand-held devices or other types of devices of the parking customers, the operators of the parking stations, parking enforcement personals, or a combination thereof. For example, the central server determines and sends response to queries regarding specific license plates for parking enforcement.

In some cases, the parking pay station may communicate to query the central parking management server with the unique identifier to identify the parking customer. In some cases, the identification of the parking customer includes identification of a registered user ID, account, one or more payment methods, one or more vehicles associated therewith, and information associated with the vehicles, such as VIN numbers, license plates, model, make, color, or other information. After a registered account is identified at the central parking management sever, other information associated with the registered account may be used to facilitate parking data entry and payment for parking. As an example, if only one license plate of the user is registered under the users account, the central parking management system may automatically select the license plate number for parking and may send the license plate information along with other parking information such as a start time and an end time to a hand-held device of an enforcement officer. Alternatively, the central parking management sever may send a list of license plates that the parking user owns to be displayed at the parking pay station. The user then can select a license plate, optionally via a touch screen or a key pad. In other cases, the central parking management system or sever transmit information such as payment reminder, payment verification, or other information to the pay station, the mobile device of the user, the hand-held device of an operator, or other third-party devices.

In some cases, the central parking management system or sever execute payment either using stored information or information transmitted from the pay parking station. As an example, the central parking management server may execute a mobile payment after the pay station transmits mobile payment information of the parking customer with other parking information, such as a start time and an end time. Alternatively, the server may directly execute a payment using a method of payment on record after the user's authorization.

In some cases, the central parking management system or sever enable the user to add/edit/remove information associated with his or her account. In some cases, the central parking management system or sever generate user-specific information such as advertisement, payment reminder to be sent automatically to the user's mobile device or email account.

In some cases, the central parking management system or sever includes an application, a software module, or application programmable interface (API) to enable additional features. In some cases, the central server automatically sends a parking reminder to the parking customer before or at a time when a paid parking time expires. In some cases, the central server automatically generates a notice of balance on an account associated with the parking customer to the parking customer. In further cases, the balance is displayed at the parking pay station. In other cases, the balance is sent via text, voice, and/or graphic messages.

In some cases, the central server include an office portal or a software module by which frequent users can create an account, manage an account, create/edit a user profile, add/edit a payment method, register a vehicles, add/edit a vehicle's information, add/edit a frequently used parking pay station, add/edit a geolocation or region that he or she normally needs parking.

In some cases, the central server determines an advertisement appropriate for the parking customer. In some cases, the advertisement is determined based, at least in part by, the identity of the parking customer, a parking history of the customer, a transaction history of the parking customer, a location of the pay station, a time of day, a day of a week, current promotions offered by nearby vendors, or a combination thereof. In some cases, advertisement is printed on the payment verification. In some cases, the advertisement is presented on a display of the parking pay station. In some cases, the advertisement is presented on a display of a mobile device of the parking customer.

In some embodiments, the central management server described herein includes a processor, a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and Internet appliances.

In some embodiments, the central management server herein includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U°, and Ouya®.

In some embodiments, the central management server herein includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM).

In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the central management server herein includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the central management server herein includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Referring to FIG. 1, in a particular embodiment, an exemplary digital processing device 101 is programmed or otherwise configured to create an application for payment for parking and for other various admissions. The device 101 can regulate various aspects of the sensor, the communications element, the payment verification, the unique identifier, the user's account, the parking pay station, the hand-held device, the central parking management server/system. In this embodiment, the digital processing device 101 includes a central processing unit (CPU, also "processor" and "computer processor" herein) 105, which can be a single core or multi core processor, or a plurality of processors for parallel processing. The digital processing device 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The digital processing device 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the device 101, can implement a peer-to-peer network, which may enable devices coupled to the device 101 to behave as a client or a server.

Continuing to refer to FIG. 1, the CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and write back. The CPU 105 can be part of a circuit, such as an integrated circuit. One or more other components of the device 101 can be included in the circuit. In some cases, the circuit is an application specific integrated circuit (ASIC) or a field programmable gate array (FPGA).

Continuing to refer to FIG. 1, the storage unit 115 can store files, such as drivers, libraries and saved programs. The storage unit 115 can store user data, e.g., user preferences and user programs. The digital processing device 101 in some cases can include one or more additional data storage units that are external, such as located on a remote server that is in communication through an intranet or the Internet.

Continuing to refer to FIG. 1, the digital processing device 101 can communicate with one or more remote computer systems through the network 130. For instance, the device 101 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 101, such as, for example, on the memory 110 or electronic storage unit 115. The machine executable or machine readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

In some embodiments, the central management server herein includes one or more non-transitory computer readable storage media encoded with a program including instructions executable by the operating system of an optionally networked digital processing device or mobile device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the central management server herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash HTML 5, Apple® QuickTime®, Microsoft® Silverlight®, Java™, and Unity®.

Figure 2:
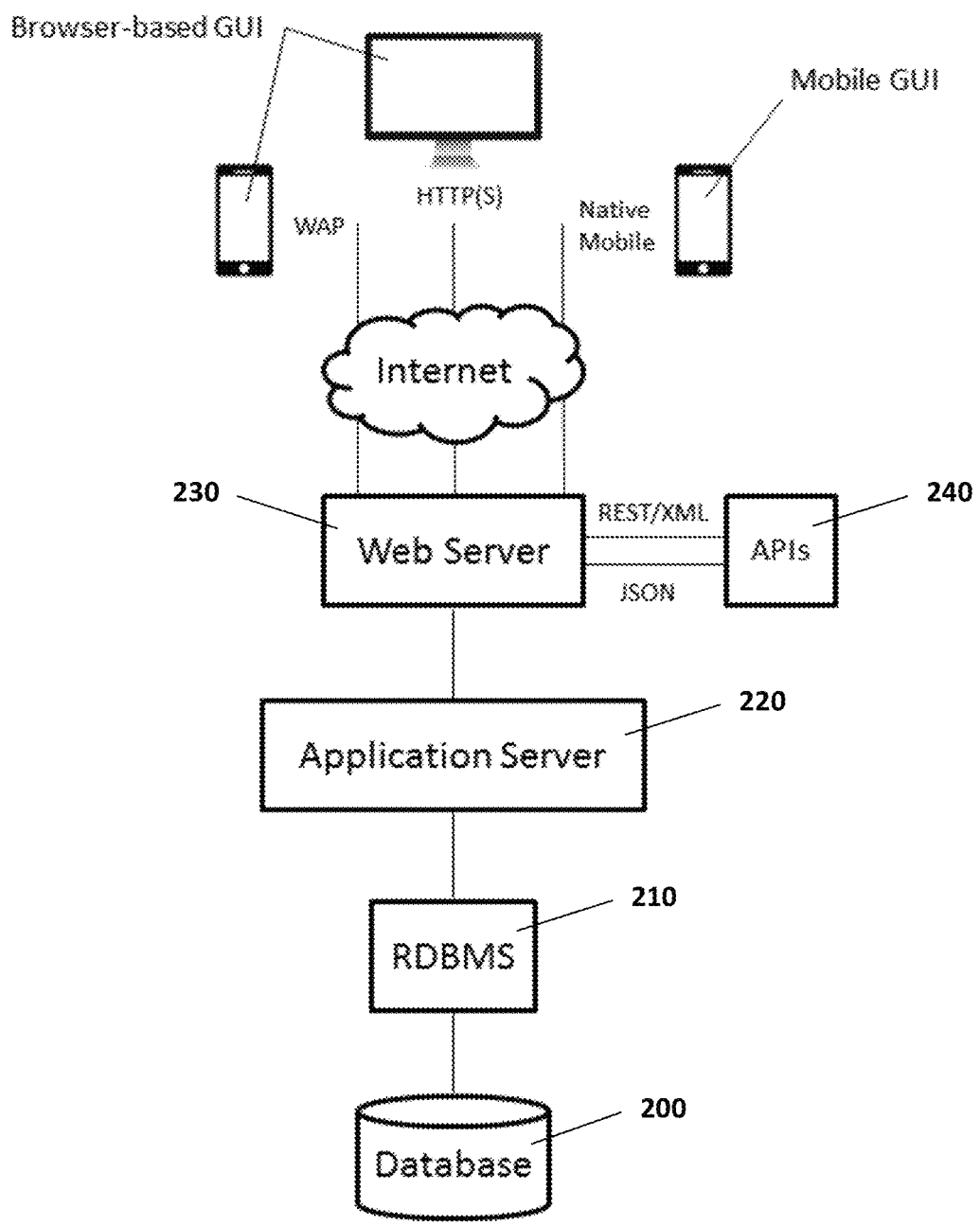
FIG. 2 shows a non-limiting schematic diagram of a web/mobile application provision system; in this case, a system providing browser-based and/or native mobile user interfaces.

Referring to FIG. 2, in a particular embodiment, an application provision system comprises one or more databases 200 accessed by a relational database management system (RDBMS) 210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 220 (such as Java servers, .NET servers, PHP servers, and the like) and one or more web servers 230 (such as Apache, IIS, GWS and the like). The web server(s) optionally expose one or more web services via app application programming interfaces (APIs) 240. Via a network, such as the Internet, the system provides browser-based and/or mobile native user interfaces.

Figure 3:
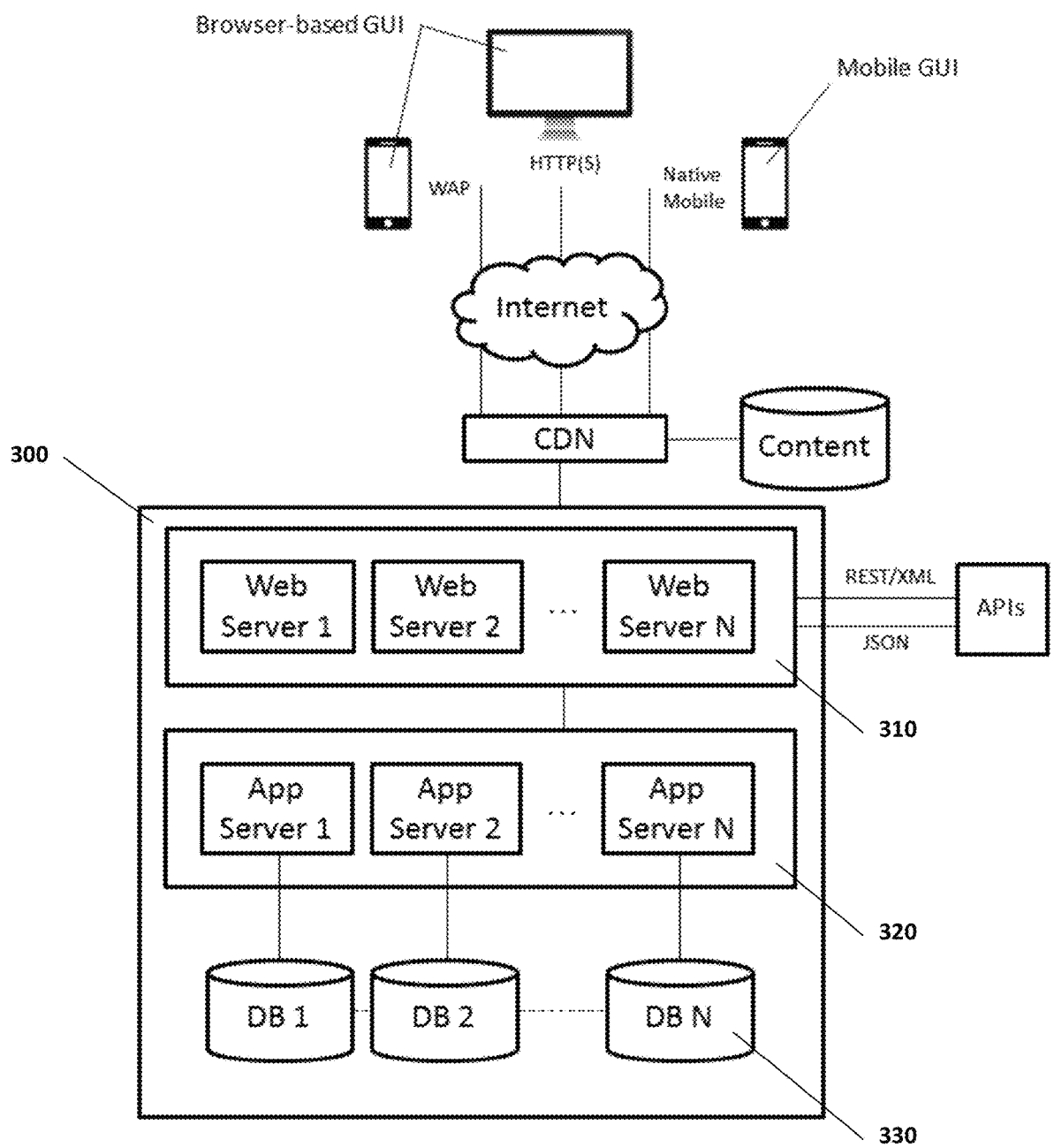
FIG. 3 shows a non-limiting schematic diagram of a cloud-based web/mobile application provision system; in this case, a system comprising an elastically load balanced, auto-scaling web server and application server resources as well synchronously replicated databases.

Referring to FIG. 3, in a particular embodiment, an application provision system alternatively has a distributed, cloud-based architecture 300 and comprises elastically load balanced, auto-scaling web server resources 310 and application server resources 320 as well synchronously replicated databases 330.

Software Modules

In some embodiments, the central management server herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information of parking customer, parking pay stations, user ID and user accounts, payment methods, unique identifier, one or more vehicles associated with a parking customer, or the like. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Payment Verifications

In some cases, the parking pay stations, methods and platform herein include a software module automatically displaying or sending payment verification to the parking customer. In some cases, the payment verification includes a paid amount, a start time of paid parking, an end time of paid parking, and/or any other information. In some cases, the payment verification is a receipt. In some cases, the payment verification is an expense report. In some cases, the payment verification is a replacement receipt. In some cases, the payment verification is utilized in a pay-by-plate or pay-by-phone parking regime.

In some cases, the payment utilizes a method and information provided by the user and readily saved at central parking management server. In some cases, the payment for parking is direct withdrawal from a prepaid account. In some cases, the payment is withdrawal using a pre-registered payment method in the user's account. Non-limiting examples include a credit card, a debit card, a Chase QuickPay, a PayPal account, or the like. The payment may be authorized by identification of the unique identifier. Alternatively, the payment may be authorized only after the user' input of another authorization information, such as a security code or a PIN.

In some cases, the payment method can be selected by the user at the parking pay station. In further cases, the user may select to use mobile payment at the parking pay station. In some cases, the mobile payment is made via Apple Pay, Samsung Pay, or Google Wallet. In some cases, the mobile payment is made via a dedicated mobile application provided by a manufacturer of the pay station or an operator of the parking spaces associated with the pay station.

In some embodiments, the payment verification is printed at the pay station. In some embodiments, the payment verification is associated with a payment from a prepaid account or a mobile payment.

In some embodiments, the mobile payment is executed locally at the pay station or at a hand-held device associated with an operator of the pay station. In some embodiments, the mobile payment is executed via a mobile application. In some embodiment, the mobile payment is communicated to the central management server and the pay station. In some embodiments, the mobile payment is executed at the central management server. In some embodiments, the mobile payment is executed via an application, a software module, or a website that communicates with the central management server.

In some cases, the payment is executed locally at the parking pay station, at a hand-held device associated with an operator of the pay station or remotely. In some embodiments, the payment is executed at the central management server. In some embodiments, the payment is executed via a mobile application, a software module, or a website that communicates with the central management server.

In some embodiments, the payment verification herein may be for payment of various admissions other than parking.

User Accounts

In some embodiments, disclosed herein are accounts for parking customers, for example, frequent users of one or more parking lots. In some cases, the user account are created by a parking customer at a digital processor and communicated to a central parking management sever. In some cases, the central parking management server includes a database that stores information of the account.

In some cases, information of the account include any information associated with the account, the parking customer, the vehicle(s) of the parking customer, one or more parking lots, or one or more parking pay stations. Such information may include but are not limited to: the account number, the user ID, the password, the name of the parking customer, an address of the parking customer, a balance remaining in the account, one or more vehicles, one or more license plates, year, make, model, color, VIN number of the vehicle, a payment method, a preferred payment type, and information of a credit card, a bank account number, a user profile, a name or address of a parking lot or a pay station, or the like.

In some cases, the account includes information associated with one or more parking event of the parking customer. In further cases, such parking events may be ongoing or past events. In further cases, such information includes information of the parked vehicle, start and end time of parking, an address of the parking lot, or the like. In some cases, the account disclosed herein allow the parking customer to edit a parking event, such as shorten a parking time or extend a parking time in his account.

In some embodiments, the user account herein may be used for payment of various admissions other than parking.

Office Portals

In some cases, the parking pay stations, methods and platforms herein include an office portal, a software module, an application, a computer program, and/or an user interface by which parking customers can create an account, manage an account, create/edit a user profile, add/edit a payment method, register a vehicles, add/edit a vehicle's information, add/edit a frequently used parking pay station, add/edit a geolocation or region that he or she normally needs parking. As such, a parking customer does not need to enter vehicle information or parking space number at the parking pay station or at the parking lot. Instead, such pre-registered accounts and vehicles, and optionally readily saved payment information, advantageously allow a parking user to easily and efficiently select a vehicle that is parked or to be parked and the corresponding payment may be executed automatically for parking the selected vehicle. Hence, errors commonly associated with data entry at the pay station can be greatly reduced or completely eliminated.

In some embodiments, the office portal, software module, an application, a computer program, or use of the same is accessible by the user using a digital processing device or a mobile device of the user. In some embodiments, the office portal communicates with the central management server using a communications element of the user's device. In some embodiments, the office portal includes one or more user interfaces so that the user may interact with the user interface via interaction at an input device of the user's device.

In some embodiments, the office portal disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, the office portal disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the office portal herein includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the office portal herein includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash HTML 5, Apple® QuickTime®, Microsoft® Silverlight®, Java™, and Unity®.

Referring to FIG. 2, in a particular embodiment, an application provision system comprises one or more databases 200 accessed by a relational database management system (RDBMS) 210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 220 (such as Java servers, .NET servers, PHP servers, and the like) and one or more web servers 230 (such as Apache, IIS, GWS and the like). The web server(s) optionally expose one or more web services via app application programming interfaces (APIs) 240. Via a network, such as the Internet, the system provides browser-based and/or mobile native user interfaces.

Referring to FIG. 3, in a particular embodiment, an application provision system alternatively has a distributed, cloud-based architecture 300 and comprises elastically load balanced, auto-scaling web server resources 310 and application server resources 320 as well synchronously replicated databases 30.

Additional Features

In some cases, the parking pay stations, methods and platforms herein include a software module that automatically sends a parking reminder to the parking customer before or at a time when a paid parking time expires. In further cases, the parking reminder is sent to a mobile device of the user. Alternatively, the reminder may be sent via email. In some cases, the parking reminder may include a link or an access for the user to conveniently extend parking time without the need for the user to be present at the parking lot or the pay station. In further cases, payment for extended parking may be automatically executed from a pre-paid account or user a readily saved payment method/information. In further cases, the extended parking is authorized by the user, optionally via user's selection in his account.

In some cases, the parking pay stations, methods and platform herein include a software module automatically displaying or sending a notice of balance on an account associated with the parking customer to the parking customer. In further cases, the balance is displayed at the parking pay station. In other cases, the balance is sent via text, voice, and/or graphic messages.

In some cases, the parking pay stations, methods, and platform herein comprise determining an advertisement appropriate for the parking customer. In some cases, the advertisement is determined based, at least in part by, the identity of the parking customer, a parking history of the customer, a transaction history of the parking customer, a location of the pay station, a time of day, a day of a week, current promotions offered by nearby vendors, or a combination thereof. In some cases, advertisement is printed on the payment verification. In some cases, the advertisement is presented on a display of the parking pay station. In some cases, the advertisement is presented on a display of a mobile device of the parking customer.

Enforcement

In some cases, enforcement is conducted with assistance of a sensor, such as a camera or a RFID reader. In some cases, the information sensed by the sensor then can be used to confirm payment or non-payment of the vehicle. As a non-limiting example, the operator may use a hand-held device with a sensor to scan each parked vehicle optionally to visually read license plate number or identify license plate information of an RFID onboard the vehicle. Alternatively, the pay station may be capable of displaying the license plates for which the paid parking time has expired so that the operator may issue tickets based on the displayed license plates.

Payment for Admissions

In some embodiments, the parking pay station, central parking management server herein may be used for payment of various admissions other than parking. In some embodiments, the admission is to an event, service, transportation, an accommodation, an activity, or the like. Non-limiting examples of the various admission includes: a bus ride, a train ride, a tour, a concert, a sport game, a conference, a museum admission, a business event, a social event, a scientific event, a train ride, valet service, a meal, or the like. In some embodiments, the parking pay station is equivalent to the pay station herein except that the pay station herein only process payment for admissions or receipts other than parking. In some embodiments, the central parking management server is equivalent to the central management server herein. In some embodiments, the parking customer is equivalent to the customer, or the user herein.

Printers

In some embodiments, disclosed herein is a printer. In some embodiments, the printer is a two-sided. In some embodiments, the printer is physically located within a pay station. In some embodiments, the printer communicates with a central management server. In some embodiments, the printer is connected to the Internet, the cloud, or any other remotely located computers, processors, or database. In some embodiments, the printer receives and execute printing instruction from the pay station, the central management sever, a mobile device of the user, a hand-held device of an operator of the pay station, or other remotely located computers and processors. In some embodiments, the printer receives and executes printing instructions automatically. In some embodiments, the printer executes printing instructions after receiving a user's instruction to print. The user's instruction may be from a mobile device, a remote computer, the pay station, a hand-held device or the like. For example, the print may automatically print payment verification after a mobile payment has been successful at the pay station. Alternatively, the user may need to press a "print" button at the pay station to start the printing process.

EXAMPLES

The following illustrative examples are representative of embodiments of the software applications, systems, and methods described herein and are not meant to be limiting in any way.

Example 1

Joe is going to a concert in a downtown area tonight. Before he heads to the concert, he downloads a mobile application and creates an account. In his account, he optionally registered his vehicle by taking a picture of his license plate. His license plate is automatically recognized by the mobile application and the plate number is saved in his account. He also entered a credit card number and other information to authorize a payment of $50.00 in the mobile application. After he enters the address of the auditorium. The mobile application also provided a number of parking lots that are within 1 mile distance and are facilitated with pay stations as disclosed herein. Joe drives to one of the parking lot, instead of entering all the information of his vehicle and his parking space, Joe scans a RFID which includes his information at the pay station, and the pay station via communication with a server, identifies Joe's account and shows the only license plate registered under Joe's account. Afterwards, the pay station allows Joe to select a time period for parking using a key pad. The payment is then automatically deducted from the balance in his account. The license plate and the paid parking period is transmitted to the central sever. When the paid parking period is going to expire in 15 minutes, a text reminder is sent to Joe's mobile device. And Joe selects to extend parking for another 10 minutes with a hyperlink provided in the text reminder using his phone. The payment for the extra 10 minutes is automatically deducted from his account.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A pay station comprising: at least one processor, a memory, a communications element, a printer, a sensor, and a computer program including instructions executable by the at least one processor to create an application comprising:
    a) a software module, when executed by the at least one processor of the pay station, receiving via the sensor a unique identifier associated with a customer, the customer having executed a mobile payment for an admission, wherein the admission is not associated with the pay station and is not for parking, and the customer getting a payment verification at the pay station;
    b) a software module, when executed by the at least one processor of the pay station, transmitting the unique identifier to a central management server and querying the central management server with the unique identifier to identify the customer and verify the mobile payment for the admission other than parking; and
    c) a software module, when executed by the at least one processor of the pay station, generating and sending instructions to the printer to print the payment verification for the customer;
    wherein the sensor is a camera, a radio-frequency identification (RFID) reader, a barcode reader, a magnetic strip reader, an infrared sensor, a capacitance, resistance, or inductance sensor, a pressure sensor, a thermal sensor, a near field communication detector, a microchip reader, a keypad, a virtual keyboard, a touch screen, an inertial sensor, or an input device, or a combination thereof.

2. The pay station of claim 1, wherein the communications element is a wireless communications element.

3. The pay station of claim 1, wherein the printer is a two-sided printer.

4. The pay station of claim 1, wherein the unique identifier is credit card information, driver license information, license plate information, a transaction identifier, or an identifier associated with a mobile device of the customer.

5. The pay station of claim 1, wherein the mobile payment is made via a wireless payment service on a smartphone or a dedicated mobile application provided by the manufacturer of the pay station or the operator of the pay station.

6. The pay station of claim 1, wherein the payment verification is a receipt, an expense report, or a replacement receipt.

7. The pay station of claim 1, wherein the application further comprises a software module determining an advertisement appropriate for the customer.

8. The pay station of claim 7, wherein the advertisement is determined based, at least in part, by an identity of the customer, a purchase history of the customer, a transaction history of the customer, a location of the pay station, a time of day, a day of the week, one or more current promotions offered by nearby vendors, or a combination thereof.

9. The pay station of claim 7, wherein the advertisement is printed on the payment verification, presented on a display of the pay station, or presented on a display of a mobile device of the customer.

10. A computer-implemented method comprising:
    a) receiving, by a sensor of a pay station, a unique identifier associated with a customer, the customer having executed a mobile payment for an admission not associated with the pay station, wherein the admission is not for parking;
    b) transmitting, by the pay station, the unique identifier to a central management server;
    c) querying, by the pay station, the central management server with the unique identifier to identify the customer and verify the mobile payment for the admission other than parking; and
    d) printing, by the pay station, a payment verification for the customer;
    wherein the sensor is a camera, a radio-frequency identification (RFID) reader, a barcode reader, a magnetic strip reader, an infrared sensor, a capacitance, resistance, or inductance sensor, a pressure sensor, a thermal sensor, a near field communication detector, a microchip reader, a keypad, a virtual keyboard, a touch screen, an inertial sensor, or an input device, or a combination thereof.

11. The method of claim 10, wherein the admission is for an event, an activity, service, or transportation.

12. The method of claim 10, wherein the printer is a two-sided printer.

13. The method of claim 10, wherein the payment verification is a receipt, an expense report, or a replacement receipt.

14. The method of claim 10, wherein the application further comprises a software module determining an advertisement appropriate for the customer.

15. The method of claim 14, wherein the advertisement is determined based, at least in part by, the identity of the customer, a payment history of the customer, a transaction history of the customer, the location of the pay station, the time of day, the day of the week, current promotions offered by nearby vendors, or a combination thereof.

16. A payment platform comprising:
    a) at least one mobile processor configured to provide a mobile payment application comprising a software module executing a mobile payment for an admission, wherein the admission is not for parking; and
    b) a pay station, wherein the admission is not associated with the pay station, the pay station comprising:
        i) a sensor, wherein the sensor is a camera, a radio-frequency identification (RFID) reader, a barcode reader, a magnetic strip reader, an infrared sensor, a capacitance, resistance, or inductance sensor, a pressure sensor, a thermal sensor, a near field communication detector, a microchip reader, a keypad, a virtual keyboard, a touch screen, an inertial sensor, or an input device, or a combination thereof;
        ii) a software module, when executed by at least one processor of the pay station, receiving via the sensor a unique identifier associated with a customer, the customer having executed a mobile payment for the admission via the mobile payment application;
        iii) a software module, when executed by the at least one processor of the pay station, transmitting the unique identifier to a central management server and querying the central management server with the unique identifier to identify the customer and verify the mobile payment for the admission other than parking;

iv) a software module determining an advertisement appropriate for the customer; and v) a software module, when executed by the at least one processor of the pay station, generating and sending instructions to the printer to print a payment verification for the customer, the payment verification comprising the advertisement.

17. The payment platform of claim 16, wherein the advertisement is printed on the payment verification, presented on a display of the pay station, or presented on a display of a mobile device of the customer.

18. The payment platform of claim 16, wherein the unique identifier is credit card information, driver license information, license plate information, a transaction identifier, or an identifier associated with a mobile device of the customer.

19. The payment platform of claim 16, wherein the mobile payment is made via a wireless payment service on a smartphone or a dedicated mobile application provided by the manufacturer of the pay station or the operator of the pay station.

20. The payment platform of claim 16, wherein the advertisement is determined based, at least in part, by an identity of the customer, a purchase history of the customer, a transaction history of the customer, a location of the pay station, a time of day, a day of the week, one or more current promotions offered by nearby vendors, or a combination thereof.

* * * * *